United States Patent [19]
Bunger et al.

[11] Patent Number: 5,955,040
[45] Date of Patent: Sep. 21, 1999

[54] INTEGRATED APPARATUS AND PROCESS FOR HIGH RECOVERY OF ACETYLENE FROM THE REACTION OF CALCIUM CARBIDE WITH WATER

[75] Inventors: James W. Bunger; Christopher P. Russell, both of Salt Lake City; Jerald W. Wiser, Kaysville; Jesse C. Tsai, Salt Lake City, all of Utah

[73] Assignee: James W. Bunger and Associates, Inc., Salt Lake City, Utah

[21] Appl. No.: 08/880,933

[22] Filed: Jun. 23, 1997

[51] Int. Cl.⁶ ........................................... B01J 8/00
[52] U.S. Cl. ................ 422/189; 422/188; 48/38; 48/57; 48/216
[58] Field of Search ................ 422/181, 188–189, 422/193; 48/38, 57, 216; 209/158; 423/497, 636

[56] References Cited

U.S. PATENT DOCUMENTS

| 5,082,644 | 1/1992 | Bunger et al. | 423/497 |
| 5,284,630 | 2/1994 | Bunger et al. | 422/189 |

*Primary Examiner*—Hien Tran
*Attorney, Agent, or Firm*—James L. Sonntag

[57] ABSTRACT

An apparatus for the manufacture of acetylene and hydrated lime from the reaction of calcium carbide and an excess of water is disclosed. A primary reactor for the initial reaction of the calcium carbide and water is disposed concentrically within a secondary reactor. Hydrated lime and unreacted calcium carbide flow directly from the primary reactor to the secondary reactor, where the carbide lime settles from the water and is removed.

16 Claims, 10 Drawing Sheets

CALCIUM CARBIDE CONVERSION IN A STIRRED TANK REACTOR WITH VOLUME OF 1000 LITER.

based on kinetics for 15-25 mm carbide feed (Scheruhn, 1950)

ACETYLENE LOST IN LIME EXIT STREAM FOR WATER IN AT 20 °C
(adiabatic conditions)

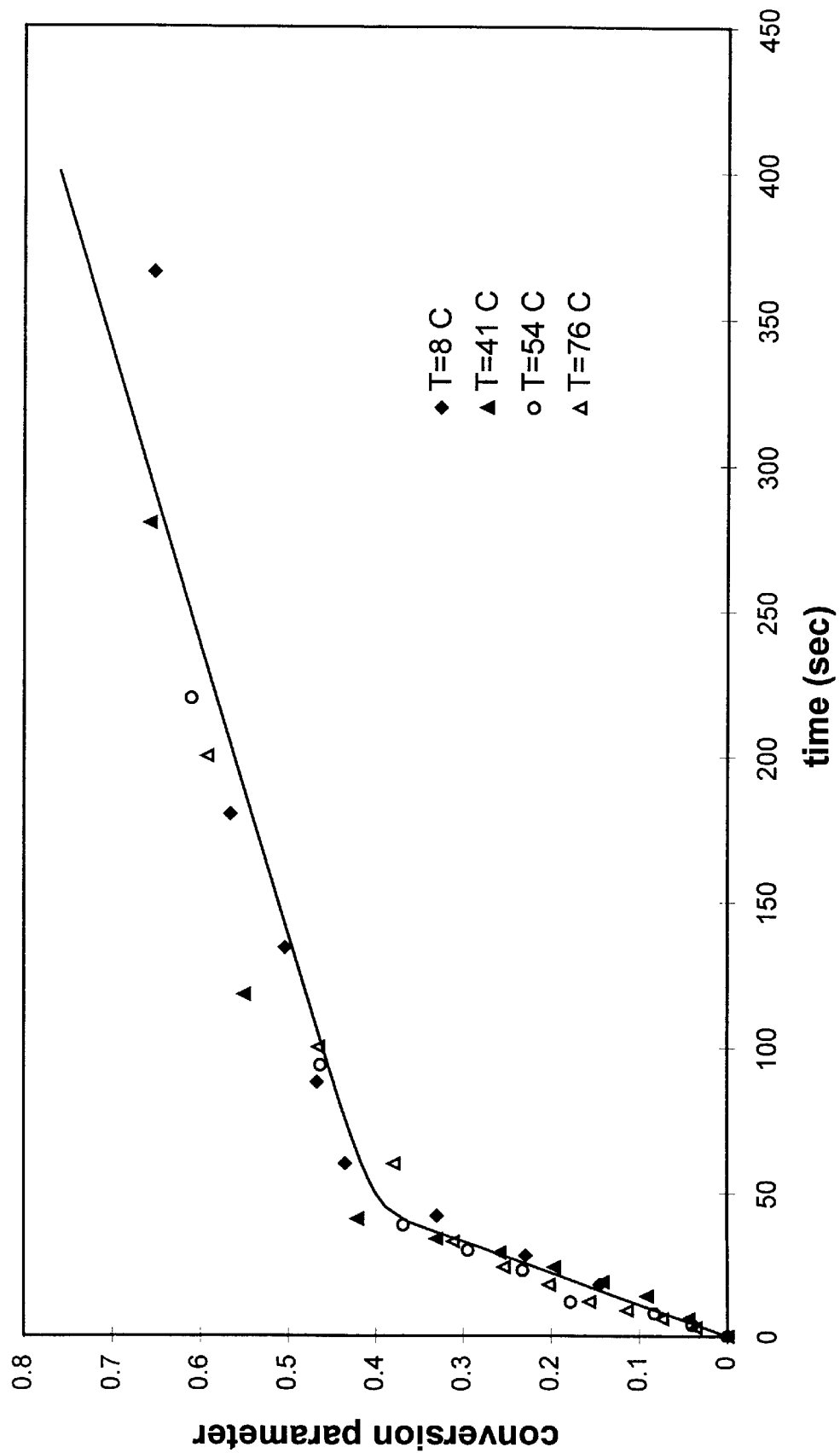

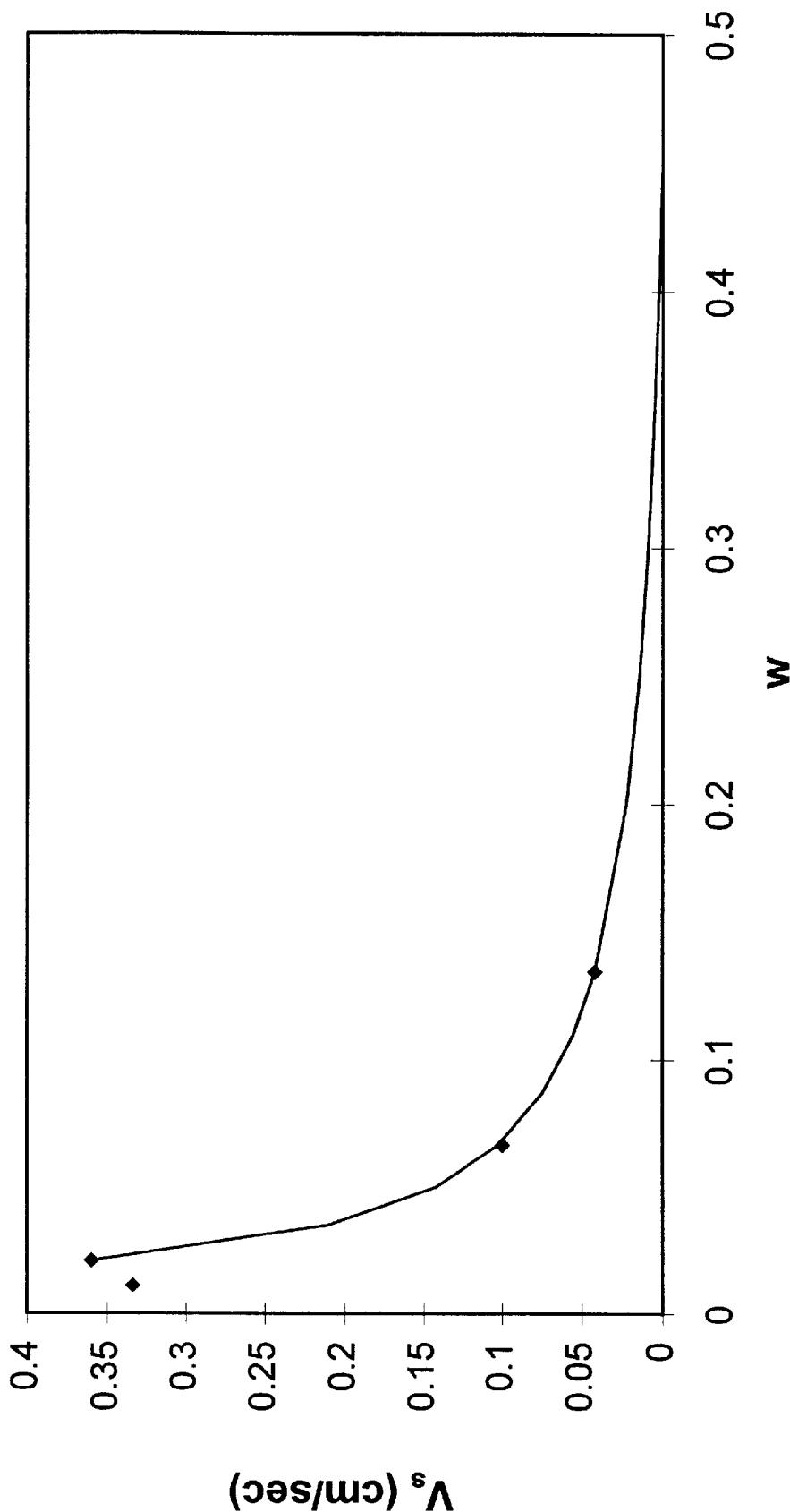

INTEGRATED APPARATUS AND PROCESS FOR HIGH RECOVERY OF ACETYLENE FROM THE REACTION OF CALCIUM CARBIDE WITH WATER

RELATED APPLICATIONS (Not applicable)

STATEMENT REGARDING FEDERALLY SPONSORED RESEARCH OR DEVELOPMENT (Not applicable)

FIELD OF THE INVENTION

This invention relates to an apparatus, control, and process for the production of acetylene and hydrated lime by the reaction of calcium carbide with water.

BACKGROUND OF THE INVENTION

In a typical wet process for manufacture of acetylene from calcium carbide, particles of calcium carbide are introduced to an excess of water in a reactor vessel on a continuous or semi-continuous (on/off) basis. Water is added continuously to the reactor and acetylene and a hydrated carbide lime slurry are withdrawn from the reactor on a continuous basis. A system is provided for stirring the contents of the reactor to mix the calcium carbide with the water and to maintain a more-or-less uniform slurry of hydrated carbide lime. Because the reaction of calcium carbide with water is exothermic, the temperature must be controlled, typically by the rate at which fresh water is added. A greater rate of water addition results in cooler temperatures and a lesser rate of water addition results in warmer temperatures.

There are several undesirable characteristics of the process of the prior art. These in summary are:

1. Some acetylene yield is lost through the premature discharge of unreacted calcium carbide.
2. Some acetylene yield is lost through the solubility of acetylene in the large volume of water passing through the reactor.
3. Operational difficulties occur due to large, solid inert particles that enter the system and interfere with the stirring mechanism and discharge pumps and valves.
4. The overall process efficiency is reduced because a low concentration of hydrated lime in the discharge stream results in low contact times in the reactor and poor use of the reactor space.
5. The hydrated carbide lime value is reduced due to the presence of granular impurities and variable hydrated lime concentrations.

These characteristics are described further as follows:

Discharge of Unreacted Carbide (breakthrough)

In a typical reactor configuration the reaction kinetics are approximated by a Constant Flow Stirred Tank Reactor (CFSTR). According to Levenspiel, Chemical Reaction Engineering, 2nd Edition, John Wiley and Sons, Inc. 1972, Chapter 5, page 97. "[one type of] ideal steady-state flow reactor is called the mixed reactor, the backmix reactor, the ideal stirred tank reactor, or the CFSTR (constant flow stirred tank reactor) and, as the name suggests, it is a reactor in which the contents are well stirred and uniform throughout. Thus the exit stream from this reactor has the same composition as the fluid within the reactor. We refer to this type of flow as mixed flow, and the corresponding reactor, the mixed reactor, or the mixed flow reactor." Most, if not all, commercially practiced wet acetylene processes approximate the CFSTR configuration.

In the CFSTR there is unreacted carbide that is mixed throughout the reactor. The particle size of the unreacted carbide varies from larger, recently introduced particles to smaller less-recently introduced particles that are nearing the completion of reaction. In an ideal CFSTR some of these smaller unreacted particles will be discharged with the hydrated lime slurry. Any acetylene generated by a particle after it has been discharged from the reactor may be lost to the atmosphere. The premature discharge of unreacted particles is referred to as "breakthrough" and, if the reaction kinetics are known, the extent to which breakthrough occurs can be estimated through calculations about an ideal CFSTR.

Practical evidence as well as theoretical calculations of CFSTR kinetics shows that this breakthrough can be significant. While the actual amount of breakthrough is affected by the particle size of the carbide feed, the hydrodynamic behavior of a carbide particle reacting to form acetylene, the internal configuration of the reactor and the inherent reactivity of the calcium carbide, the amount of breakthrough increases as the space velocity of the reactor increases. Space velocity is defined conventionally as the number of reactor volumes displaced in one hour.

FIG. 1 is a graph showing the mathematical relationship between the space velocity and breakthrough, assuming ideal behavior and relying on published data for CFSTR kinetics. For reactors of space velocities equaling four or greater (4000 liter/hr. in FIG. 1), the ideal conversion is about 96% or less, which means that the breakthrough losses are greater than 4% of the acetylene that is produced from a given carbide feed. Most commercial reactors in operation today operate at a space velocity greater than four, which means that the breakthrough losses are even greater.

Dissolution Losses

Another problem with traditional technologies is the losses of acetylene to dissolution in water. FIG. 2 shows the solubility of acetylene in water as a function of temperature for three commonly operated pressures. It may reasonably be assumed that the water of the hydrated lime discharge slurry is saturated in acetylene, and unless this water is recycled to the system, all of the acetylene dissolved in the water will eventually be lost to the atmosphere. The amount of acetylene contained in the discharge hydrated lime slurry can be calculated by knowing the amount of water exiting the reactor and its outlet temperature and pressure. Even if some of the water is recycled to the reactor the open vessels which serve as settling tanks to thicken the hydrated lime are exposed to the atmosphere and a large portion of the acetylene so dissolved is lost.

To illustrate, if pure calcium carbide (MW=64) is reacted to form acetylene (MW=26) with enough water to result in a 5% hydrated lime (MW=74) slurry, the amount of water flowing from the outlet per Kg of acetylene produced will be:

$$(1 - .05)\frac{74}{0.05 * 26} = 54 \text{ Kg-Water/Kg-Acetylene}$$

Assuming that the outlet temperature is 50° C. and the reactor pressure is 0.3 atm-gauge (a typical set of conditions), the amount of acetylene contained in 54 Kg of water is 0.09% or 0.05 Kg. Thus about 5% of the acetylene generated is lost to the atmosphere through the dissolution in water. This loss is in addition to the acetylene lost as a result of breakthrough of unreacted particles.

Operational Difficulties

Another problem with conventional technologies pertains to the operational difficulties created when non-reactive materials are introduced along with the calcium carbide. These unreactive materials, which are present in all commercially available calcium carbide materials, usually comprise inert coke, solid ferrosilicate and other metallic or mineral particles. These are materials introduced with the limestone or coke fed to the furnaces that manufacture calcium carbide and are carried through to the final product. These inert materials accumulate in the reactor and if not removed will eventually interfere with the stirring mechanism and discharge pumps or valves, causing mechanical breakdown. Smaller particles that do not rapidly settle are carried through to the settling tanks where they may accumulate, causing difficulties with the discharge system.

Loss of Process Efficiency

Another problem of traditional systems is that the concentration of hydrated lime in the reactor is kept low, usually below about 10 weight percent, to reduce premature settling of hydrated lime, i.e., to keep the slurry of the hydrated lime precipitate in a free-flowing state. If allowed to settle the hydrated lime would result in plugging of discharge lines or create unmanageable accumulations of hydrated lime in the reactor, or both. Low hydrated lime concentrations also result from the manner in which temperature is controlled. In a typical process, temperature is controlled at 50° C. If the temperature begins to rise, the usual procedure is to increase the rate of water feed, which brings down the temperature, but also has the undesirable result of further diluting the hydrated lime output stream. In hot weather, where heat losses to the environment are reduced, and for very large systems, the hydrated lime concentration in the output stream can fall to as little as 3 weight percent.

The operational requirement for low concentrations of hydrated lime requires larger reactors for a given space rate or a higher space rate for a given reactor size. Larger reactors require greater capital costs. Higher space rates result in greater breakthrough. Low hydrated lime concentrations also result in a greater per unit water throughput increasing the losses due to solubility. The combined losses due to these effects are typically 8 to 12%, which means that only 88 to 92% of the acetylene produced by a given calcium carbide is recovered. Finally, the resulting hydrated lime discharge stream must be sent to larger holding vessels in order to provide adequate residence time for the hydrated lime to thicken for subsequent use or disposal. These vessels occupy more land and require the need for additional capital investment.

Loss of Calcium Hydroxide Product Value

Particulate impurities contained in the calcium carbide are carried into the hydrated lime product unless they are filtered out at some expense and operational effort. These small particle impurities may adversely affect the value of the hydrated lime for downstream utilization. In general, the value of hydrated lime improves if the granular impurities are reduced in both size and quantity. The value of hydrated lime also improves with concentration and with consistency in concentration. Most downstream uses require the transportation of the hydrated lime and the greater the concentration, the more $Ca(OH)_2$ is transported per ton of slurry. In commercial practice of the prior-art, little if anything is done to segregate small particle impurities. In addition, processes to increase the concentration of the hydrated lime are separate from the reactor and add additional capital and operating costs.

Objects of the Invention

An object of the present invention is to reduce the aforementioned problems of a) loss of acetylene due to breakthrough, b) loss of acetylene due to solubility, c) operational difficulties due to inert materials, d) loss of process efficiency due to low hydrated lime concentrations, and e) loss of hydrated lime value due to particulates and low, or variable, hydrated lime concentrations.

It is also an object of the present invention to provide an apparatus and a process for reacting calcium carbide with water that provides a high level of recovery of the acetylene produced.

It is also an object of the invention to improve the level of recovery of acetylene in the reaction of calcium carbide with water by reducing or eliminating breakthrough and minimizing the acetylene dissolved in the water discharge stream.

It is also an object of the invention to provide an apparatus and a process which allows for high completion of reaction and low breakthrough of calcium carbide in a given reactor space.

It is also an object of the invention to provide an apparatus and process which provides low losses due to dissolution of acetylene.

It is also an object of the invention to provide an apparatus and a process which segregates large particles from small particles thereby improving the operability of the process and the value of the co-produced hydrated carbide lime.

It is also an object of the invention to provide an apparatus and a process which improves the process efficiency by improved utilization of reactor space.

It is also an object of the invention to provide an apparatus and a process which provides for control functions which allow for flexible acetylene output while maintaining a steady-state hydrated lime concentration and constant temperature.

It is also an object of the invention to provide control of the pressure of the apparatus while allowing variable acetylene production and steady-state concentration of hydrated lime and constant temperature.

It is also an object of the invention to provide a process control strategy which provides for maintaining the preferred temperature and hydrated lime concentration conditions while varying acetylene output.

It is also an object of the invention to provide an acetylene/calcium hydroxide production process in which the calcium hydroxide product is uniform in quality (particle size, purity and concentration).

It is also an object of the invention to provide an apparatus and process in which the hydrated lime product can be recovered from the reactor at high $Ca(OH)_2$ concentrations.

It is also an object of the invention to provide an apparatus and process which minimizes the requirements for internal moving parts and as a consequence simplifies the construction and operation of the apparatus.

It is also an object of the invention to provide an apparatus and process which minimizes the number and size of ports, external fittings, and moving seals through the pressure vessel, and as a consequence simplifies the construction and improves the overall safety and operability of the apparatus and process.

Further objects of the invention will become evident in the description below.

BRIEF SUMMARY OF THE INVENTION

Overview

The present invention is an improvement of the apparatus and process disclosed in U.S. Pat. Nos. 5,082,644 and 5,284,630 to Bunger et al. (Bunger et al.), which are hereby incorporated by reference. The Bunger et al. system comprises two successive reaction steps. In the first step particulate calcium carbide is charged into an entrained or ebullated flow primary reactor containing water. The water in the primary reactor is directed upward to ebullate calcium carbide particles. The calcium carbide particles react with the water until their size becomes small enough to become entrained and carried upward in the upward flow of water. These particles of unreacted calcium carbide and the solid calcium hydroxide reaction product entrained in the upward water flow are conveyed through a conduit to a separate secondary reactor to complete the reaction of the calcium carbide particles under plug flow conditions. The calcium hydroxide produced in the primary and secondary reactors is allowed to settle in the secondary reactor and is recovered. Acetylene gas generated in both reactors is drawn off above either or both reactors.

The Bunger et al. reaction system is continuous. The calcium carbide feed can be metered in a controlled manner into the reaction system. The calcium hydroxide is typically much purer than that produced by conventional acetylene processes, because the entrained flow in the primary reactor serves to effectively separate out particulate impurities introduced with the calcium carbide, such as oversized coke and mineral impurities, which are usually are not entrained and carried into the secondary reactor. Thus, the calcium hydroxide product has a higher market value and can be used as a feedstock for the production of high-value calcium derivatives.

Apparatus and Process of the Present Invention

The present invention utilizes the same dual reaction system as the Bunger et al. system. However, in the present invention, the entrained flow primary reactor is positioned within the secondary reactor, preferably in a concentric manner with the axis of the two reactors coinciding. Thus, the present invention has the same advantages as the Bunger et al. system. However, the placement of the primary reactor within the secondary reactor materially increases the control over the reaction, eases construction and reduces costs, augments the efficiencies of the system, and improves the product purity.

The apparatus of the present invention is a single-vessel, two-stage reactor system for producing acetylene by reaction of calcium carbide and water. In the first or primary reactor, calcium carbide is continuously charged into an ebullated and entrained flow reaction environment containing an excess of water. The primary reactor is disposed concentrically within secondary reactor, such that the secondary reactor surrounds the primary reactor in an annular fashion. The unreacted water with unreacted calcium carbide and calcium hydroxide product from the primary reactor flows over an overflow (e.g., weir or ports) at the perimeter of the primary reactor directly into the secondary reactor. The secondary reactor is configured as a dense phase, laminar plug-flow reactor where calcium hydroxide product is allowed to settle and is removed from the bottom of the reactor. Most of the calcium hydroxide settles, but a minor portion may remain in suspension in the water, that is withdrawn from the secondary reactor over an overflow weir and recycled to the primary reactor.

According to Levenspiel (1972), "[the other] of the two ideal steady-state flow reactors is variously known as the plug flow, slug flow, piston flow, ideal tubular, and unmixed flow reactor, . . . We refer to it as the plug flow reactor and to this pattern of flow as plug flow. It is characterized by the fact that the flow of fluid through the reactor is orderly with no element of fluid overtaking or mixing with any other element ahead or behind. Actually, there may be lateral mixing of fluid in a plug flow reactor; however, there must be no mixing or diffusion along the flow path. The necessary and sufficient condition for plug flow is for the residence time in the reactor to be the same for all elements of fluid."

The majority of the reaction occurs in the primary reactor ebulated bed reaction system (essentially CFSTR), and is then transferred to a plug-flow reaction system in the secondary reactor. The plug-flow reaction environment in the secondary reactor allows for substantial completion of the reaction of calcium carbide with water. The advantage of any plug flow reactor is that a reaction can be completed in the smallest possible reactor space. Further, there is no mixing of unreacted materials with that element in the reaction system which has completed its reaction.

Acetylene is drawn off as it is generated in the primary and secondary reactors. Calcium hydroxide formed by the reaction is separated in the secondary reactor by settling and is removed from the dense zone at the bottom of the secondary reactor.

A suspension of unreacted calcium carbide particles and calcium hydroxide is transferred between the primary reactor and the secondary reactor over a concentric overflow weir at the periphery of the primary reactor. Since the suspension flows directly from the primary reactor into the secondary reactor, the need of any cross-over piping is eliminated. With no cross-over piping the possibility of plugging of a pipe and the heat loss from the surface of the piping is eliminated. The two-stage, single vessel reaction system is also mechanically simpler, and thus less expensive to build and maintain. In the secondary reactor itself no mechanical mechanism is required, such as rakes. However, it is contemplated to use such rakes if desired. The internal placement of the primary reactor within the secondary reactor permits a much smaller footprint than separate placement of the two reactors.

Another advantage is that only one pressure vessel need be built. The walls of the primary reactor are only required to separate it from the secondary reactor. Since there is virtually no pressure differential between the reactors, the construction of the primary reactor may be of light-weight design. The pressurization for the entire reaction system is maintained by the outer walls of the reaction vessel, requiring construction and certification of only one pressure vessel.

The concentric internal placement of the primary and secondary reactors allows a common header at the top of the pressure containment vessel to be used for gas collection for both the primary and secondary reactors. The result is a significant overall reduction in gas volume in the reaction system, as compared to separating the two reaction systems into separate pressure vessels. This increases the volume available for reaction, and increases safety by decreasing the volume for potential adverse and undesirable reactions.

Control of the Process

Temperature

The concentric construction of the primary reactor within the secondary reactor allows for an unprecedented control of the process, measurably greater than in conventional systems and the dual reactor Bunger et al. system. Since the primary reactor is contained within the secondary reactor, there is a much lower heat loss from the primary reactor as compared to a separated reactor construction as disclosed in the Bunger et al. patent. Most of the heat of reaction is generated in the primary reactor, and instead of losing heat to the external environment, it is insulated from the external surfaces of the reactor vessel by the surrounding secondary reactor. Thus, heat leaves the primary reactor mainly by vapor generation, by reactant/product flow into the secondary reactor and through the wall separating the reactors. Thus, the secondary reactor can be maintained at a higher temperature to decrease acetylene solubility. Temperature control of the primary reactor is eased, since the secondary reactor is usually at a higher temperature than the external environment and heat lost from the primary reactor out through the primary reactor walls to the secondary reactor is minimized since the secondary reactor temperature differs slightly from that of the primary reactor.

Basically, the present system allows for retention and recovery of much of the reaction heat produced in the primary reactor where most of the heat from the calcium carbide/water reaction is produced. The lower heat loss allows for better temperature control in the primary reactor and operation at a higher reaction temperature. The secondary reactor may also be operated at a higher temperature, because of the higher temperature of the primary reactor and heat added from the primary reactor. The higher reaction temperature is favorable as it lowers the solubility of acetylene in water, reducing the reservoir of unrecoverable acetylene dissolved in the water in the reaction system and allowing it to be recovered as the desired product gas.

The process temperature may be conveniently controlled by adjusting the loss of heat to the surroundings. Because of the concentric, heat conserving dual reactor design, temperature is conveniently controlled by conserving the heat generated in the system, if a higher temperature is required, or dissipating heat to the environment, if cooling is desired. Heat conservation may be accomplished, for example, by heat exchanging the slurry output with the water inlet. Dissipating heat to the environment or may be accomplished, by cooling the water recycled between the secondary reactor and the primary reactor. This means of temperature control is a significant departure from conventional practice which uses the water input as a means of temperature control. Making temperature control independent of the water input flow rate allows for independent adjustment of the water input flow rate to maintain a predetermined hydrated lime slurry concentration.

Control of Hydrated Lime Product Concentration

By practice of the present invention, the concentration of $Ca(OH)_2$ in the hydrated lime slurry removed from the system can be set at essentially any convenient concentration, even at high concentrations wherein the hydrated lime is settled and in the form of a semisolid slurry. In principle, the hydrated lime concentration can be as high as desired, and is limited in practice only be its flow characteristics. This contrasts with conventional systems which require operation in a regime of an agitated free-flowing and dilute liquid slurry for the removal of the slurry. In the present invention, there is a secondary reactor in which the hydrated lime is allowed to settle into a thickened slurry that is free of particulate impurities that would seriously interfere with its easy removal from the reactor.

The hydrated lime slurry, by the present process, can be produced at a consistent composition, i.e., with a consistent water concentration. This consistency of composition along with the removal of impurities in the entrainment system, results in a purer, higher-value product.

The high concentration of hydrated lime and its corresponding lower concentration of water allows for many advantages. The absolute amount of hydrated lime produced is set by the acetylene demand, because it is stoichiometrically related to the amount of acetylene produced. If the concentration of the hydrated lime is high, that dictates that the absolute amount of excess water used in the system is lower. The lower amount of water reduces the amount of water that is available for dissolving acetylene. As indicated above, a significant loss of acetylene is due to acetylene becoming dissolved in the excess water that passes out of the system. Reducing the water in the system by increasing the hydrated lime concentration materially reduces these losses.

Another advantage of the reduction of water flow through the system is that the space velocity is reduced for the same size reactor, which reduces the possibility of breakthrough, i.e., calcium carbide being carried through and out with the water/lime output. By the practice of the invention, with its reduction of dissolved acetylene and the significant reduction in breakthrough, theoretical calculations show that 99 percent, or more, of the acetylene available from the calcium carbide feed can be recovered.

Another advantage of the reduction of water flow through the system is that the reactor size can be reduced for the same space velocity. This reduces the size of the reactor and as a result reduces the capital costs. The use of a plug-flow reactor regime results in a more effective use of the available space than for CFSTR reactors. Total internal volumes of less than ⅓ of conventional reactor volumes are possible without an increase in breakthrough.

Another advantage of reducing the water input is that the heat loss from the system through the water is reduced. A substantial amount of the heat is lost from the system through the heated excess water leaving the system. This limits the operating temperature of the system. By reducing the amount of water passing through the system the operating temperature can be increased, which reduces the losses from acetylene dissolved in water since the solubility of acetylene is reduced.

A high lime-concentration slurry can be handled in the present invention because of the higher quality of the hydrated lime product. In conventional practice there is no classification and separation of solid impurities. Thus, if the hydrated lime product were removed in a settled, thickened state from the bottom of a conventional CFSTR reactor, it would contain significant amounts of "rocks", which would create severe operational problems. Accordingly, the hydrated lime is removed in conventional systems as a free-flowing suspended slurry, and the rocks that settle are periodically removed from the bottom of the reactor by a separate means. In contrast, in the present invention these impurities are removed in the primary reactor entrainment system, leaving the slurry in the secondary reactor essentially free thereof. Operationally, this allows slurry removal through a simple metering pump, throttling valve, or other appropriate means. Thus, the rate of removal of the hydrated lime, and hence the hydrated lime concentration in the water/lime slurry and the amount of water throughput, can easily be controlled. Basically, the only upper limitation to the concentration of the hydrated lime in the slurry is the viscous effects that occur when the concentrations of the hydrated lime exceeds about 40 wt. %.

BRIEF DESCRIPTION OF THE DRAWINGS

FIG. 9 is a graph describing the kinetics of the reaction of calcium carbide with water, showing conversion parameter v. time.

FIG. 10 is a graph showing settling velocity of calcium hydroxide with respect to calcium hydroxide concentration in terms of weight percent.

DETAILED DESCRIPTION OF THE INVENTION

Apparatus

Figure 3:
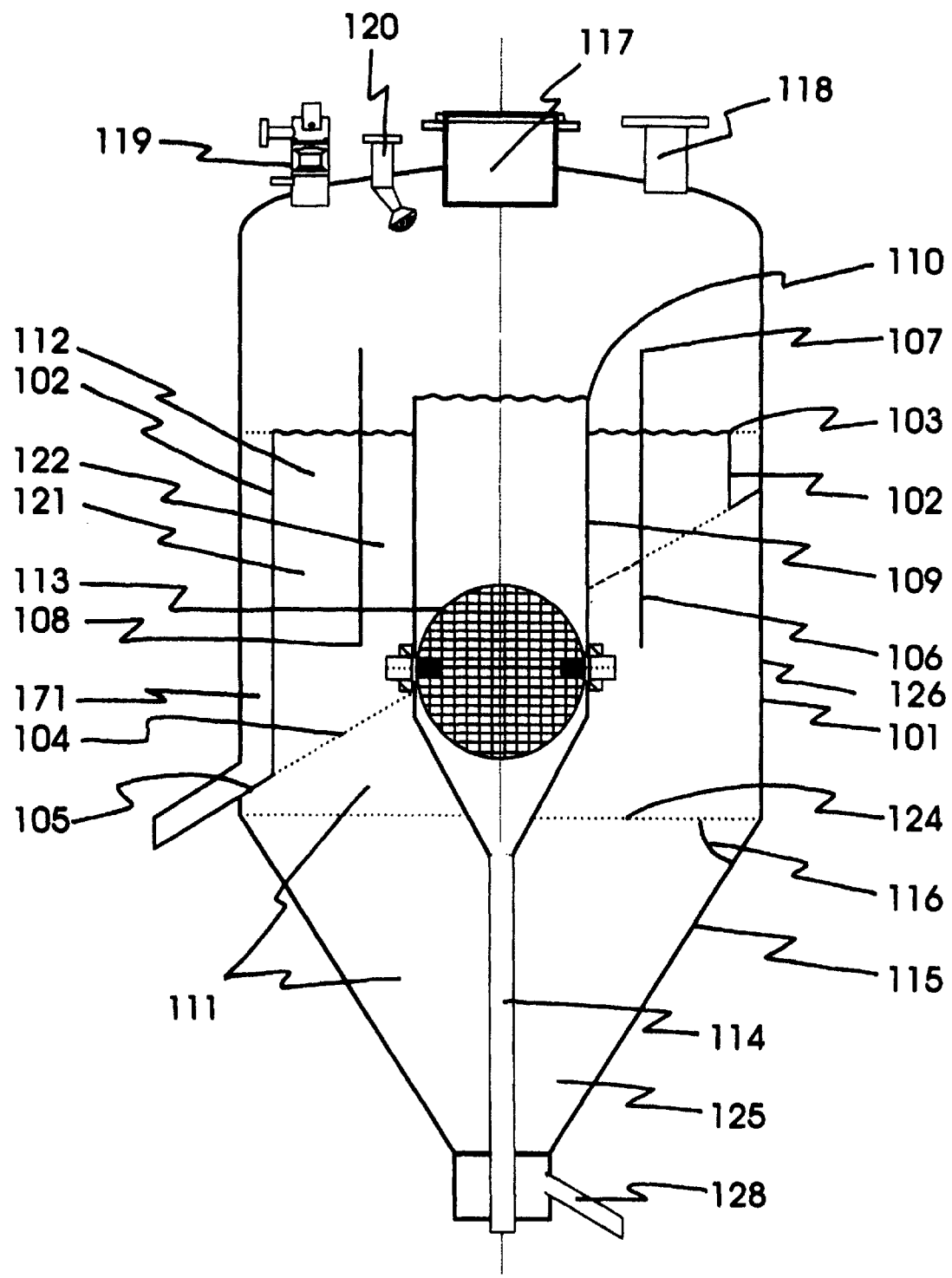
FIG. 3 is a cross-section of a reactor system of the invention.
Figure 4:
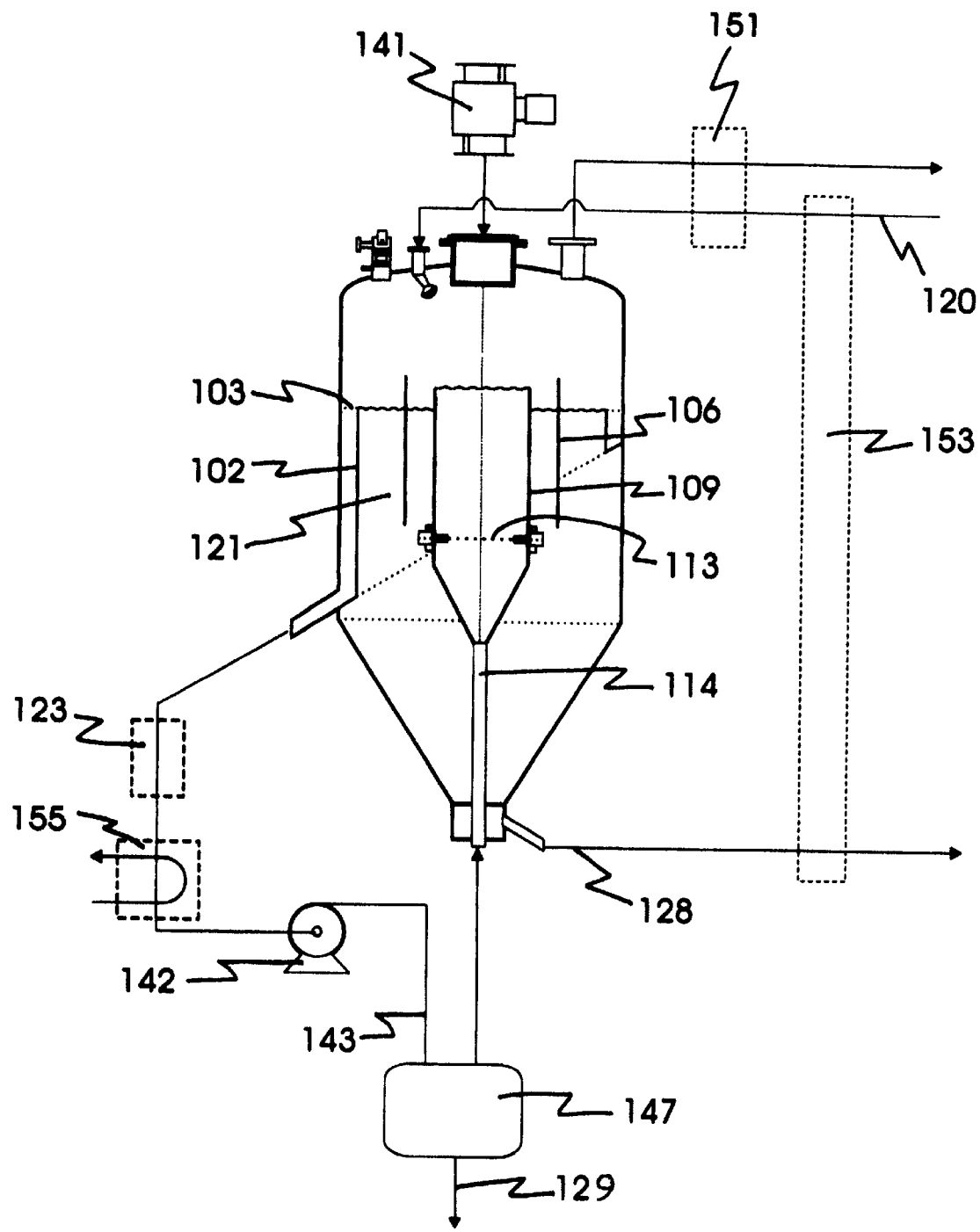
FIG. 4 is a schematic of an apparatus of the invention incorporating a reactor as in FIG. 3.

Reference is made to FIGS. 3 and 4, which illustrate an apparatus of the invention. The apparatus is comprised of a main reactor vessel 101 designed to withstand internal operating pressures according to regulatory standards. Within the cylindrical portion of the reactor walls is fitted a cylindrical weir wall 102 which top provides a circular weir 103 over which water/slurry may flow. At the bottom of the weir wall and between the weir wall and the reactor wall is fitted a plate 104 at such an angle to the horizontal so that water/slurry will be directed to the low point of the plate 105.

Between the weir wall 102 and a primary reactor 109 is fitted a baffle 106 which top elevation 107 exceeds the top elevation 110 of the primary reactor 109 and which bottom elevation 108 extends below the elevation of the circular weir 103. The top elevation 110 of the primary reactor 109 is intermediate between the top elevation of the circular weir 102 and the top elevation 107 of the baffle 106. The baffle 106 is used to direct the flow of $Ca(OH)_2$ and unreacted calcium carbide in a downward direction toward the secondary reactor plug-flow reaction zone 111 and to provide a quiescent environment settling of $Ca(OH)_2$ into a dense zone 125.

The primary reactor 109 may be fitted with a rotatable screen 113 (shown in FIG. 3 in its vertical, discharge position and in FIG. 4 in its operating horizontal position) in the bottom portion or bottom elevation of the primary reactor 109 which supports the bed of calcium carbide. This screen 113 may be rotated about a horizontal axis to allow for discharge of any unreactive material that has been retained on the screen 113.

Below the primary reactor is fitted a velocity control restrictor 114 which supplies water/slurry to the primary entrained flow primary reactor 109 and allows for discharge of unreactive particles. The velocity control restrictor 114 originates in a disengagement zone and holding tank or zone 147 which allows for separation of inert particles from the slurry recycle.

The plug-flow reaction zone 111 of the secondary reactor 121 is configured as a simple cone 115 which angle 116 is greater than the angle of repose of settled hydrated lime. Alternatively, the cone may be fitted with a slow-moving rake (not shown).

The top of the reactor is fitted with a port 117 for introducing calcium carbide, a port 118 for discharge of acetylene and appropriate over pressure relief devices 119. Make-up water is introduced to the system at a top water inlet port 120 and is introduced to the vapor space by any convenient distribution method. The top inlet port 120 may optionally include sprayers as shown.

The primary reactor 109 is sized to be sufficiently small in diameter as to provide maximum settling time in the upper part of the secondary reactor and to minimize the mass flow rate of the recycle stream needed to ebulate the reactor bed. Conversely, the primary reactor is sized to be sufficiently large in diameter so that the reactor operates in a bubble-flow regime and not a slug-flow regime. The height of the primary reactor is sized so as to contain a sufficient volume for controlled reaction of the instantaneous steady-state inventory of calcium carbide, but not so large that space is inefficiently used.

The baffle 106 is sized large enough to reduce the downward velocity of the liquid overflowing the primary reactor wall but small enough to provide long residence time in the rising portion 112 of the secondary reactor 121. The annulus between the weir wall 102 and the main reactor vessel wall is sized to be sufficiently large to accommodate the flow of recycle water, but not so large that it reduces the available space needed for the baffle 106 or the primary reactor 109.

In the illustrated design, the only internal movable part is the screen, and this part only moves occasionally during cleaning. Thus the only moving seal in the pressure vessel is that required for the screen axis, which is not required to operate during normal operation of the system. This contrasts with conventional CFSTR designs that have many penetrations of the pressure vessel with moving seals, such as for rakes, grates, etc., which function continuously through the process. In addition, the mechanical energy for the process of the present invention is supplied by an external pump 142 that drives the recycle stream, which requires no drive shafts penetrating the reactor vessels. The reduction of moving seals in the pressure vessel materially simplifies the mechanics and increases the reliability of the system.

Process

In the process of the invention calcium carbide is introduced to the primary reactor 109 by any suitable calcium carbide feeding means 141 through the calcium carbide feed port 117. The calcium carbide reacts with water in the primary reactor 109. The water is recycled by pump 142 from the secondary reactor 121 through a water recycle pipe 143, and introduced to the primary reactor from the bottom through the velocity control restrictor 114 to create a reaction in an ebullated environment with water flowing up through solid particles. Large particles settle to the level of the screen 113 where they react until they become small enough to become entrained by the upward velocity of water in the primary reactor 109 when they are carried over into the secondary reactor 121. Particles of impurities settle through the screen or are periodically discharged (by rotating the screen 113) and allowed to settle through the velocity control restrictor into a holding tank 147 fitted at the bottom. The screen is rather coarse, e.g., about 10 mm or coarser, so that only large particles are retained on the screen. The holding tank 147 is periodically emptied through a discharge port 129.

Small particles of unreacted carbide, $Ca(OH)_2$ and inert materials are carried over the top 110 of the primary reactor 109 after which they flow downward by the force of gravity into the annular space 122 between the primary reactor 109 and the baffle 106. The downward momentum of the fluid and its entrained particles passing over the primary reactor wall 110 so that the particles drop to the elevation of the water, (as determined by the elevation of the circular weir 103) assures that the particles are completely submerged in water, thereby reducing or eliminating the accumulation of dry particles on the surface that may occur when feeding calcium carbide of small particle size.

Calcium hydroxide and any unreacted calcium carbide are allowed to travel downward between the annular space 122 between the primary reactor and the baffle, where they begin to settle into the dense zone 125 of the secondary reactor. A portion of the slurry travels under the lower elevation 108 of baffle 106 and rises in the space for the rising portion 112 of the secondary reactor 121 between the weir wall and the baffle where it overflows the top of the weir wall. Water/slurry overflowing this weir wall is drained to the lowest point 105 where it exits the reactor vessel and is recycled through line 143 to the bottom of the velocity control restrictor.

The material introduced through the recycle line 143 to the bottom of the primary reactor 109 through the velocity control restrictor 114 serves as the mixer in the primary reaction, creating the flow of water necessary for the ebullated reaction environment, and the classification of particles in the velocity control restrictor 114. The recycle rate also affects the hydrodynamic behavior in the primary reactor 109 and the upper portion of the secondary reactor 121 and provides a means for distributing heat from the primary reactor to the secondary reactor. While the recycle is primarily used to recycle water, the material in the recycle loop may include in addition to water, suspended solids such as calcium hydroxide, and other solids. Using any appropriate screening apparatus 123, the recycle loop may serve the purposes of screening from the system any lighter-than-water debris that may inadvertently be introduced to the system, since such debris will be retained in the loop.

Below the lower elevation 108 of the bafffle 106 and the top 124 of the cone the hydrodynamic behavior undergoes a transition to a condition approximated by Plug Flow Reaction (PFR) kinetics, which has been defined above. For first order chemical reactions the ideal PFR is the only reactor which, in theory, will allow for (very nearly) complete reaction within a finite reaction space. Thus, the apparatus of the invention provides a reaction environment in the lower portion of the secondary reactor which approximates that of a PFR and as a result, in theory, allows for virtually complete reaction and as a consequence, the almost total elimination of breakthrough.

Settled and concentrated calcium hydroxide is discharged from the bottom of the cone through line 128 to a hydrated lime containment area. In the process of the invention the reaction is performed under conditions which maximize the concentration of slurry. The segregation of large particulates in the primary reactor allows for thickening and settling in the secondary reactor without concern for operational difficulties that occur with CFSTR reactors. This allows for convenient operation of a throttling valve in the exit stream that can operate at any convenient pressure.

Control

Mass Flow Control

Figure 5:
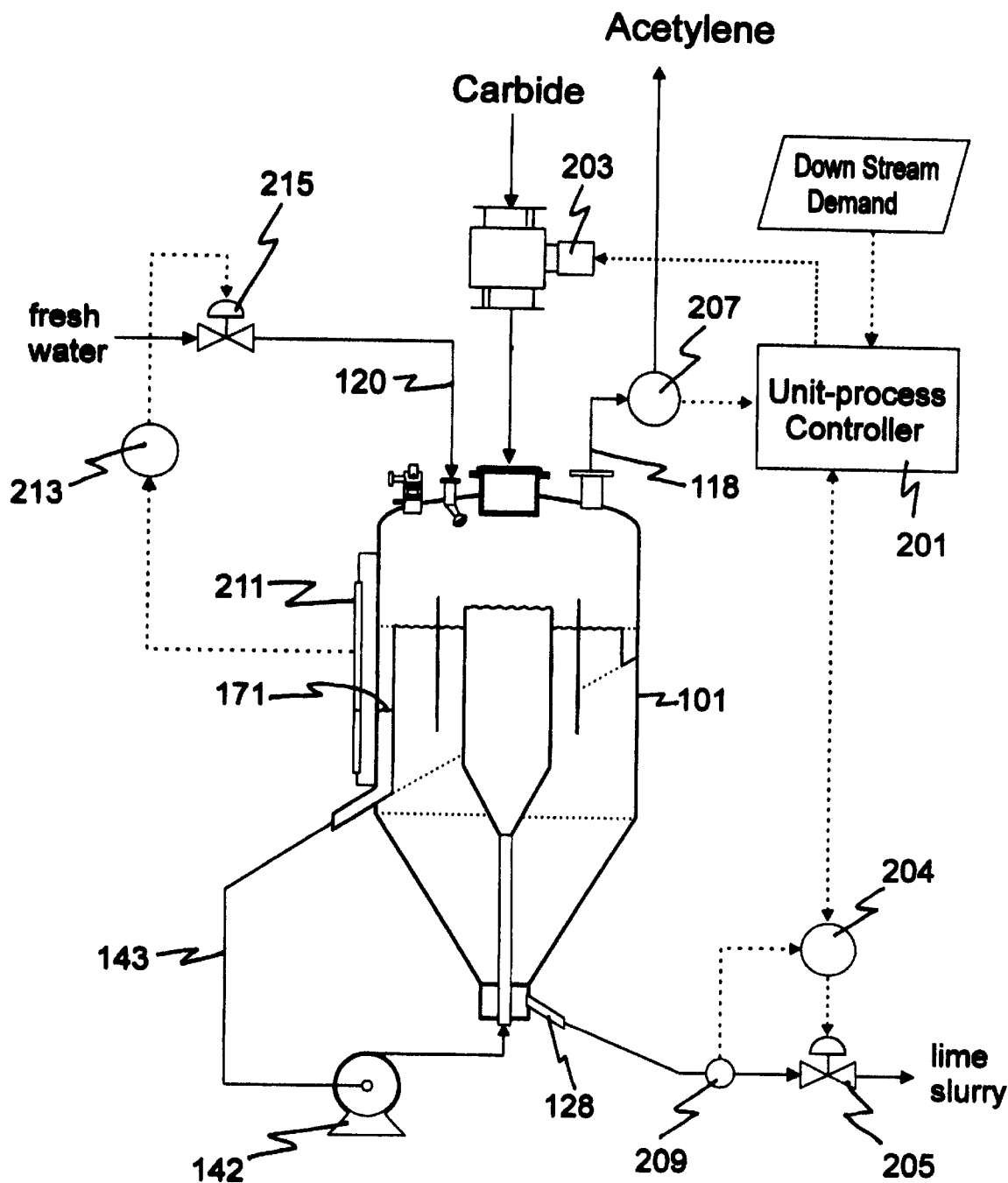
FIG. 5 is a schematic showing a preferred material control method of the invention.

The preferred mass flow control strategy is shown in FIG. 5. The downstream demand for acetylene dictates all other process flows. The downstream demand is sensed by the process control 201 which controls a calcium carbide feeding means 203. An optional flow measurements device 207 is used to measure acetylene production rate and may provide information to supplement the downstream demand information.

The same information used to control the carbide feed rate is sent to the hydrated lime slurry valve controller 204 which controls the rate at which the hydrated lime slurry is discharged by means of a metering valve 205. The rate at which hydrated lime slurry is discharged may be a fixed ratio of the calcium carbide fed, thereby establishing a fixed concentration of slurry.

An optional density/mass flow meter 209 provides information to the controller about the actual flow rate and density of the slurry. Information regarding the density of the slurry may be used for fine tuning of the metering valve 205.

Fresh water is added through water inlet ports 120 to maintain the liquid inventory at a constant level in the reactor system. The reactor system is fitted with a level detection device 211 of any convenient design. An electronic differential pressure device is one such means and this device monitors the level of fluid in the weir annulus 171. A signal from the level detection device is sent to a controller 213 which controls the flow of fresh water by means of a throttling valve 215. If the level of fluid falls below a predetermined level, the level controller 213 farther opens the throttling valve 215 to direct water through. Conversely, if the level of fluid rises above a predetermined level the level controller 213 further closes the metering valve 215 to restrict the flow of water through 120. The level of water in the weir annulus 171 is thus maintained at a level preestablished by the desired set-point on the level detection device 211.

In the process of the invention the rate of water addition is controlled to maintain a steady inventory of fluid in the system and is a consequence of control of other process variables. Combined with a steady-state flow of calcium carbide to the reactor this allows for a steady-state concentration of slurry from the reactor. By prescribing the desired concentration of the outlet slurry the rate of discharge can be precisely adjusted to achieve that concentration and the remainder of the flow parameters, specifically the water flow, are automatically adjusted accordingly.

Figure 6:
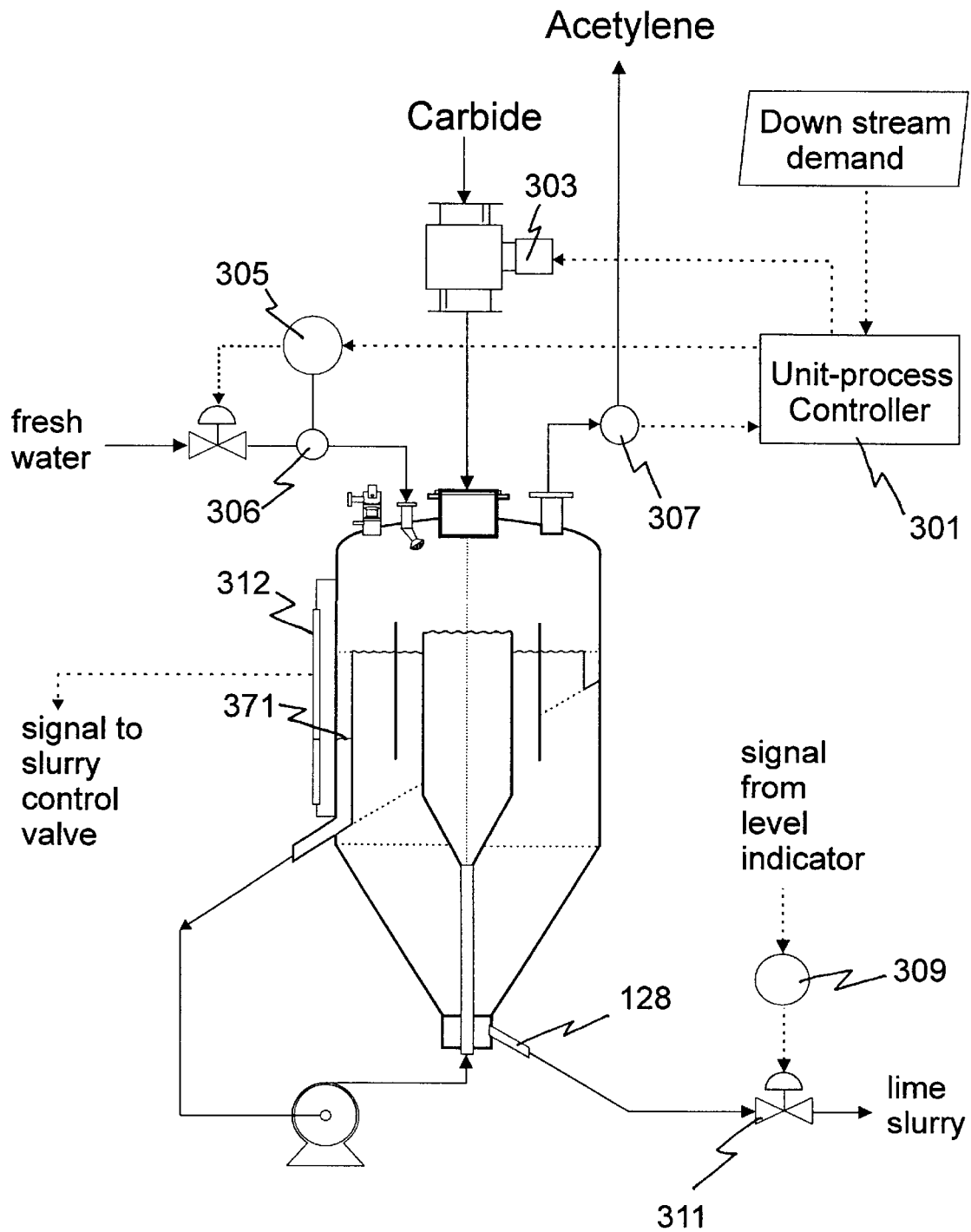
FIG. 6 is a schematic showing an alternate material control method.

An alternative mass flow control strategy is shown in FIG. 6. In the alternative strategy the carbide feed rate means 303 is controlled by a controller 301 sensing downstream demand, as before. An optional flow measuring device 307 is used to measure the production rate and may be used to fine tune the control.

In the alternative strategy, a predetermined flow rate of water is established based on the anticipated amount for reaction losses, humidity losses and free water desired in the slurry. An optional flow meter 306 is used to provide information to the controller 305 as to the actual flows.

In the alternative strategy the inventory of fluid within the reactor is detected by a level detection device 312 and set to a prescribed level in the weir annulus 371. The level is influenced by the rate of discharge of hydrated lime slurry controlled by a device 309 controlling the hydrated lime slurry outlet valve 311.

Temperature Control

Figure 7:
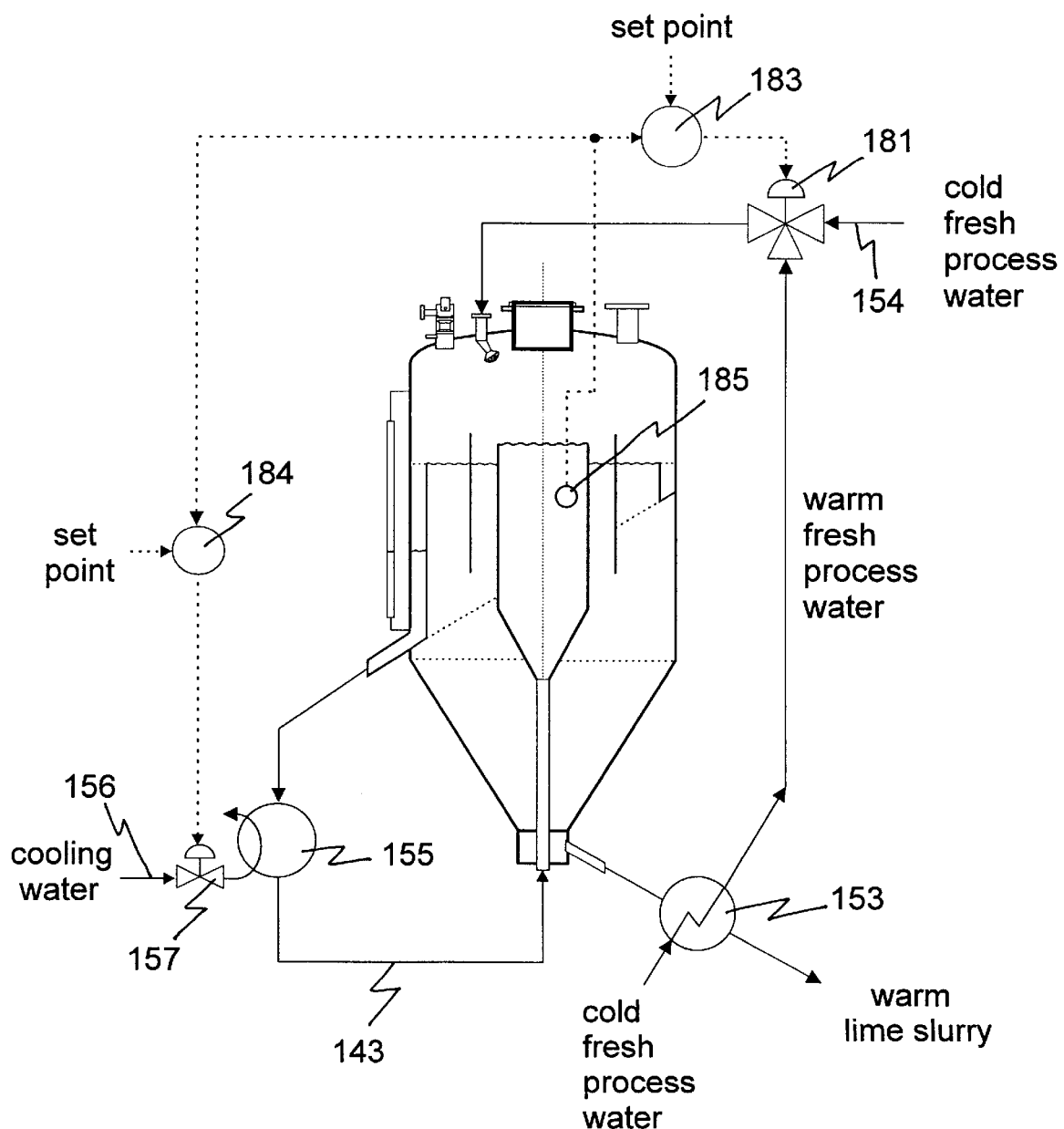
FIG. 7 is a schematic showing a temperature control method.

Temperature is controlled by adjusting the heat losses to the environment. If it is required to recover heat, as would occur for lower concentrations of hydrated lime, colder feed water or a colder environment, heat can be recovered at either of two convenient points. These are the hot acetylene gas and the slurry outlet stream. Heat recovered from either of these streams can be reintroduced into the fresh water feed by a feed/effluent heat exchanger 151 or 153 shown in phantom in FIG. 4 (or in FIG. 7 showing recovery from the slurry effluent). Water heated from the hydrated lime slurry effluent in 153 may be introduced directly into the reactors as in FIG. 4, or as in FIG. 7, mixed with unheated water through a mixing valve 181, which is controlled by a controller 183 that monitors the temperature of the primary reactor by temperature sensor 185.

For highly concentrated calcium hydroxide outlet streams with a correspondingly lower water throughput or for warmer feed water temperatures or warmer environments, the operating temperature may rise above regulatory limits if a means of cooling is not provided. Under these circumstances, the temperature is maintained below regulatory limits by a controlled release of heat to the environment. This can be accomplished by lowering or eliminating the heat recovery at exchangers 151 and 153. Heat may also be released to the environment by cooling the recycle stream by a suitable heat exchanger 155. (See FIGS. 4 and 7.)

The preferred temperature control strategy is shown in FIG. 7. The desired temperature is sensed 185 in the primary reactor and a set point is selected, not to exceed regulatory limits. The controller 183 controls the proportion of fresh process water 154 which passes through a feed/effluent heat exchanger 153 and that which does not pass through the heat exchanger. This temperature control loop is operational whenever the desired temperature is higher than the operating temperature.

When the operating temperature is higher than the desired temperature, the system may be cooled by withdrawing heat from the recycle loop or water recyle pipe 143 by means of a heat exchanger 155 cooled by cooling water 156. A controller 184 controls the rate at which cooling water 156 passes through the heat exchanger 155 by means of a throttling valve 157.

In effect, temperature is controlled by conserving or dissipating heat between the reactor and its surroundings. The strategy allows for control of temperature without having to influence any of the process flow rates. Specifically, maintaining a constant system temperature does not require adjustments in any of the process flow rates, even when the carbide feed rate varies or when there are uncontrolled temperature effects (changes in fresh water temperature, changes in the temperature of ambient surroundings, etc.). Thus, the process of the invention provides for unusually steady-state operation in all major process variables. Most importantly, a steady-state of calcium hydroxide outlet concentration can be achieved and a steady-state operating temperature is maintained even when the rate of acetylene and calcium hydroxide production is varied.

This uncoupling of the temperature control and mass flow rate control is a significant departure from the prior art in which temperature and mass flow rates are highly coupled. By uncoupling the two requirements, both temperature and mass flow rates can be independently controlled for optimum performance without the need to compromise one or the other.

Safety Control

Appropriate safety devices are designed to shut down the system in the event of over- or under-filling, for over-temperature, for over-pressure, or for loss of fresh water or recycle flow. Additionally precautions are taken against under-pressure that may occur when a low pressure operation is shut down and cooled. All customary engineering precautions are taken to ensure safe operation in the event of partial or total failure of electrical or mechanical components.

Preferred Process Conditions

Figure 1:
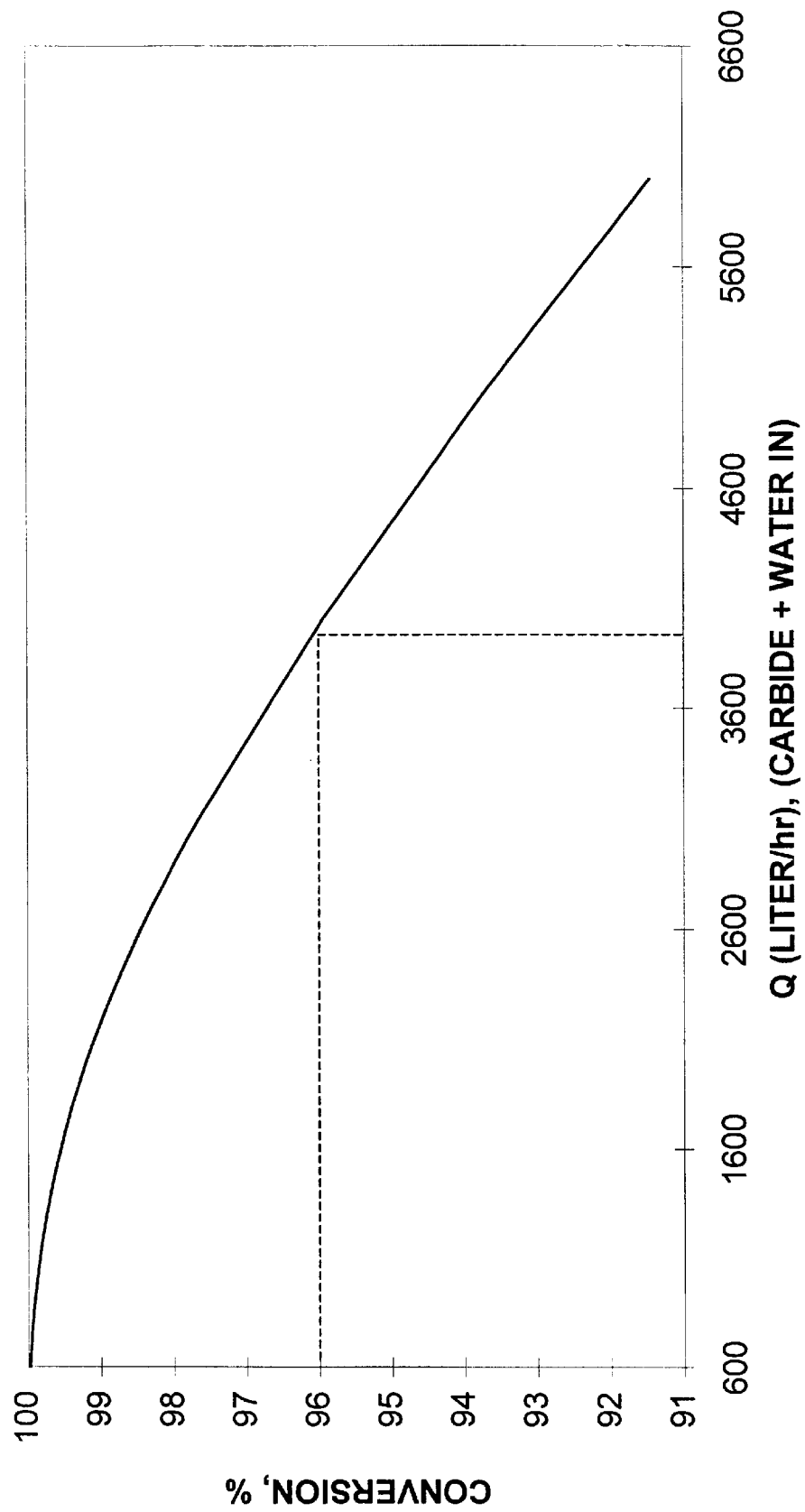
FIG. 1 is a graph showing conversion of calcium carbide and breakthrough in a prior-art continuous stirred tank reaction system.
Figure 2:
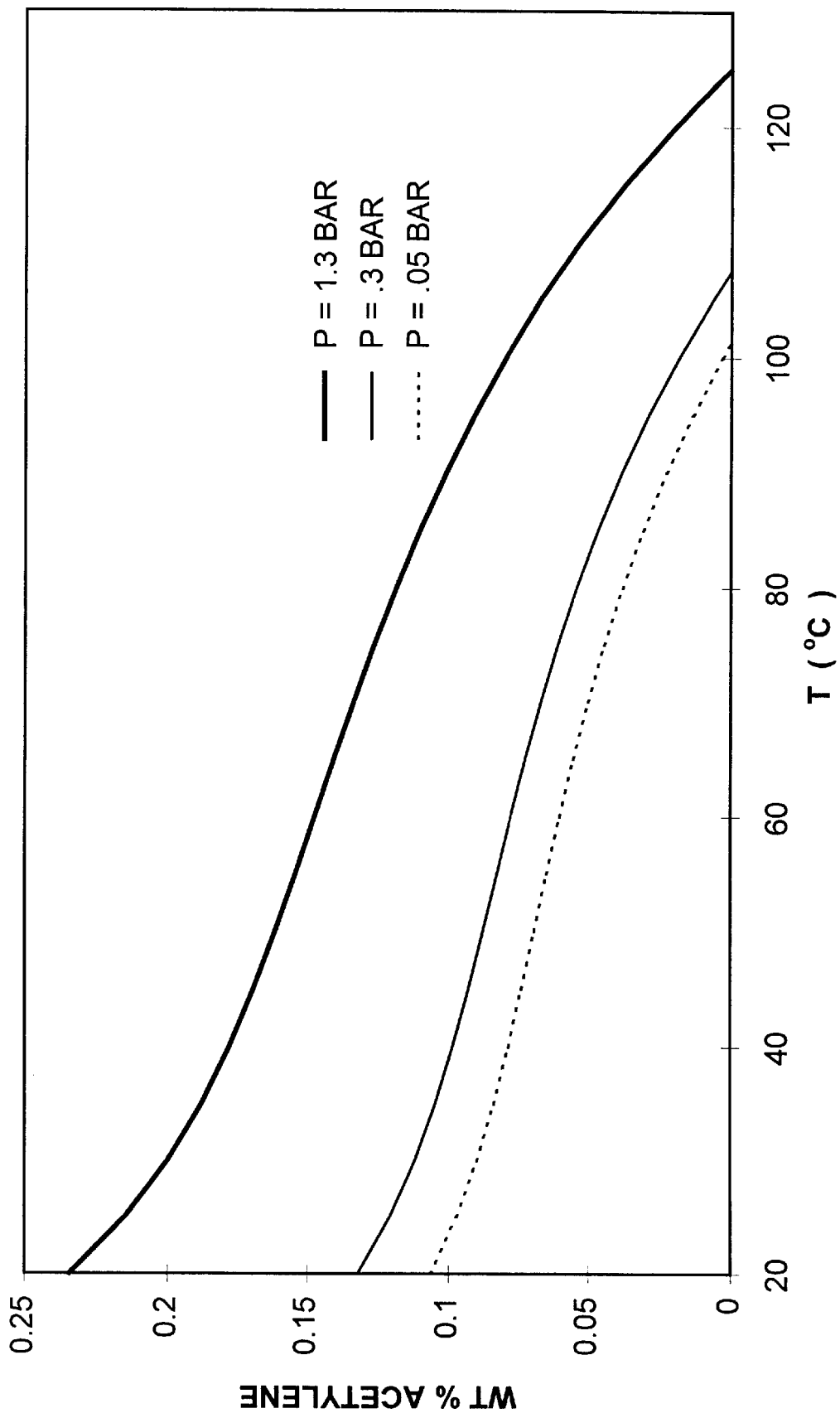
FIG. 2 is a graph showing the solubility of acetylene in water.

In the process of the of the invention, calcium carbide is fed to the primary reactor and the reaction is allowed to proceed under temperature and pressure conditions which maximize the recovery of acetylene. Both temperature and pressure have a significant influence on the concentration of acetylene dissolved in the outlet water. The solubility of acetylene in water as a function of temperature and pressure is given in FIG. 2, which shows the solubility at various pressures gauge (1 atm ambient pressure). The graph shows that the lowest solubility occurs at high temperatures and low pressures. In the preferred mode of operation, the reaction between calcium carbide and water is carried out at the highest temperatures allowed by regulation and the lowest pressure acceptable as an inlet pressure for the downstream apparatus. Following this principal, it would be desirable, from a thermodynamic point of view, to operate the system at pressures below atmospheric (vacuum) and such operation is within the spirit of the invention. Practical problems with potential ingress of air and regulatory standards may limit the actual pressure conditions of the process to something greater than atmospheric pressure, preferably 0.02 bar or greater.

In the process of the invention the loss of acetylene due to solubility in the discharge water is due to two factors, the amount of acetylene dissolved in a unit of water (or otherwise retained in the slurry output) and the number of units of water discharged per unit of acetylene produced.

Figure 8:
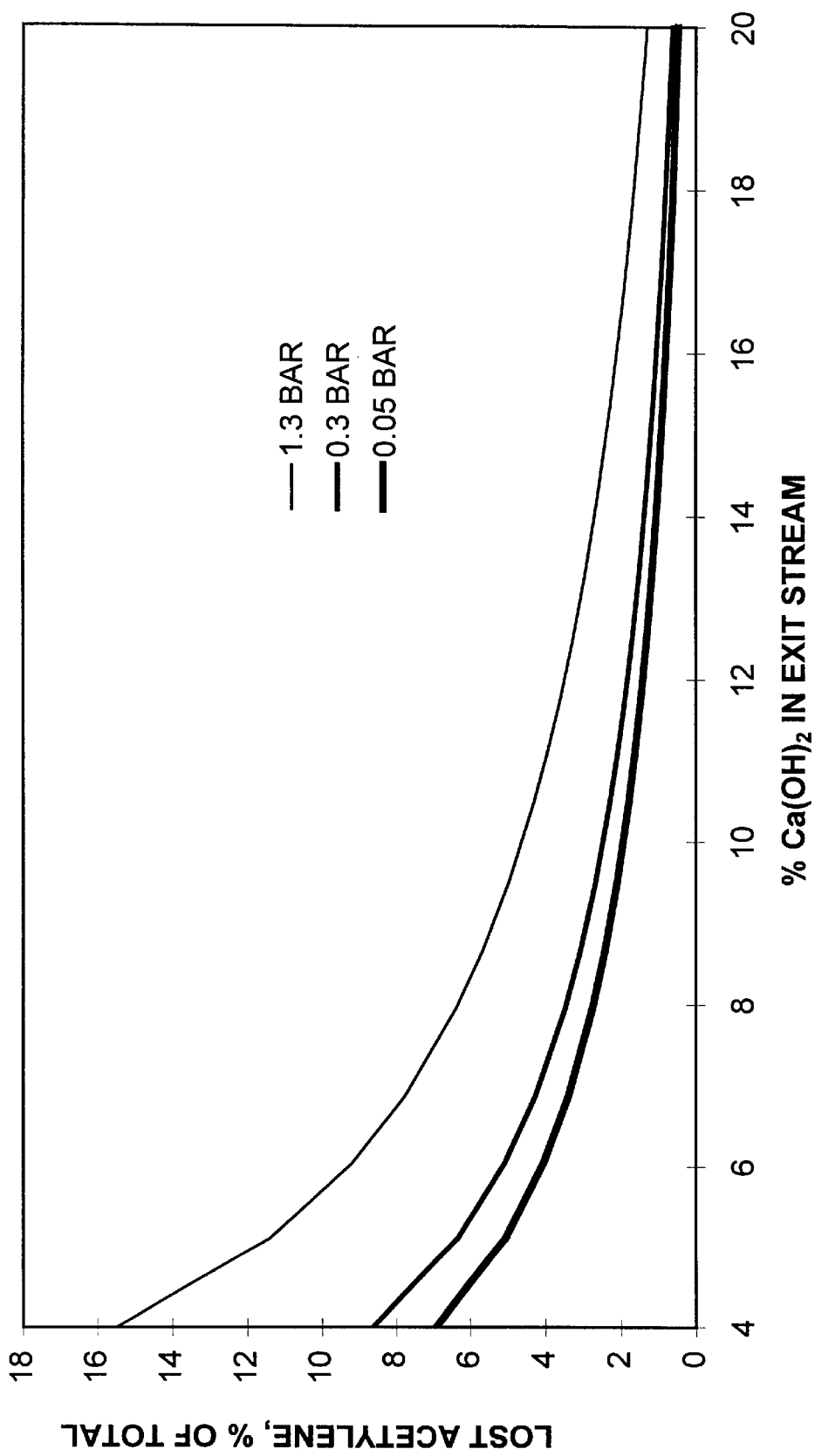
FIG. 8 is a graph showing the percent of acetylene produced which is lost through solubility as a function of hydrated lime concentration.

Simple mass balance calculations show that the number of units of water discharged per unit of acetylene generated is directly reflected in the concentration of hydrated lime in the outlet. FIG. 8 illustrates the percent of the acetylene manufactured which is lost through solubility as a function of hydrated lime concentration operating at three typical pressures and at thermally adiabatic conditions and for a calcium carbide feed that is 80% $CaC_2$ and 20% $CaO$ (a typical composition). As seen from the graph, as the hydrated lime concentration increases, the lost acetylene decreases.

Accordingly, preferred operating conditions are at higher hydrated lime concentrations, at lower pressures, and higher temperatures. Using mathematical modeling, an acetylene recovery of 97.2% can be achieved at secondary reactor temperature of 70° C., a pressure of 1.3 bar, and 14 wt. % hydrated lime concentration. This recovery can be increased to 99.8% by a secondary reactor temperature of 90° C., and a pressure of 0.05 bar, and a hydrated lime concentration of 40 wt. %. In summary, to achieve an acetylene recovery greater than 97%, the process of the invention is operated at a secondary reactor temperature above 70° C., a pressure between 0.02 and 1.3 bar gauge, and a hydrated lime concentration between 14 and 40 wt. %.

Rate and Thermal Effects

Details of the invention are further understood in view of the rate and thermal effects.

Rate Effects

Reaction Kinetics—Reaction kinetics refer to the rate of reaction of calcium carbide with water. This rate depends on the starting size of calcium carbide particles, pH of water, but not much on temperature or pressure. Rates may also vary in unknown ways with carbide sources from differing calcium carbide manufacturing processes.

FIG. 9 illustrates the kinetics of calcium carbide reaction with water. Here the conversion parameter ($\xi$) is defined as;

$$\xi = 1 - \left[1 - \frac{C_2H_2}{(CaC_2)_0}\right]^{1/3}$$

where $C_2H_2$ is the amount of acetylene evolved at time (t) and $(C_2H_2)_0$ is the total amount of acetylene that can be evolved. Defining a conversion parameter is this fashion is a way of linearizing the rate of evolution of acetylene from a three-dimensional shrinking calcium carbide particle as it reacts with water.

As shown from the graph of FIG. 9, which is derived from actual data, the reaction is initially quite rapid as shown by the steep slope of the line. This is following by a regime exhibiting much slower reaction kinetics. The present invention utilizes the two reactor design to exploit this kinetic behavior. In the primary reactor, the initial rapid reaction stage takes place, along with a rapid generation of heat. The reacting of the particle in the slower regime does not occur until after the particle has been substantially reduced in size and has been carried into the secondary reactor. The secondary reactor has a long residence time. Because most of the reactor space is used to perform this secondary reaction and because a plug flow reaction regime is maintained, the calcium carbide particles can become fully reacted, in spite of the fact that their reaction rate is slow when they are in the second reaction regime.

Settling Velocity—This rate effect addresses settling velocity of carbide particles, calcium hydroxide particles and inert impurities in the original carbide. The settling velocity depends on particle size, density of the particles, density of the fluid, and viscosity of the fluid. In the case of calcium hydroxide, the settling rate also depends on the settling effects in a slurry, which are highly complex and not easily described mathematically. The larger the particle, the more important are the bulk slurry properties, the smaller the particle, the more important are the surrounding fluid properties. Particle size may be influenced by the carbide manufacturing process. Particulates of alumina have significant effects of settling velocities because they create hydrates which interfere with settling at the microscopic and molecular level. FIG. 10 is an illustration of the settling velocity of $Ca(OH)_2$ versus the weight fraction in the slurry. As shown from the graph, the settling velocity decreases as the weight fraction increases, which indicates the difficulty of achieving high concentrations of hydrated lime by gravity settling from dilute hydrated lime suspensions of the prior-art. However, in the present invention, where concentrations of hydrated lime are maintained at high values at all times, long settling times are not needed to obtain a product of high concentration.

Preferably the hydrated lime concentration in the process of the invention is 14 wt. % or higher. The withdrawal rate for withdrawing the slurry is preferably at a ratio of the rate to the mass flow rate of the calcium carbide feed less than 8, more preferably less than 5.

Mass Flow Rates—This rate effect considers the rate at which water and carbide ($CaC_2$, CaO, impurities) enter the reactor, the rate at which acetylene and calcium hydroxide are produced by the reactions and the rate at which calcium hydroxide and water are discharged from the reactor. The input and output rates are dictated by stoichiometric relationships and desired slurry concentration. The overall mass balance for varying operating conditions are discussed in further detail below.

The mass flow rate also includes the rate of recycle even though this rate does not affect the overall mass balance. Unless heat is deliberately removed from the recycle stream, the recycle rate also has little influence on the overall energy balance. However, the rate of recycle is highly important to several operational parameters. As recycle rate is increased, the following occur:

1. The ebullation effect in the primary reactor is increased and the size of particles entrained in the vertical flows increases.
2. The temperature rise from the bottom to the top or the primary reactor decreases, allowing the temperature in secondary reactor to be higher without exceeding regulatory temperatures in the primary reactor.
3. The size of particle allowed to settle in the velocity control restrictor increases.
4. The rise rate of water between the baffle and the weir wall increases reducing the settling of $Ca(OH)_2$ and thereby increases the concentration of slurry in the recycle loop.
5. The size of unreacted particles that might settle in the velocity control restrictor is increased.
6. Consumption of electrical energy is increased.

Conversely, a lower recycle rate has the following effects:

1. The ebullation effect in the primary reactor is decreased and the size of the particle entrained is decreased.
2. The temperature rise in the primary reactor increases, placing an upper temperature limit on how hot the recycle stream can be.
3. The segregation of particles between the secondary reactor and the primary reactor results in a cleaner hydrated lime product.
4. The rise rate between the baffle and the weir wall is decreased leading to settling and lower concentrations of hydrated lime in the recycle streams.
5. The downward velocity between the primary reactor and the baffle is decreased, resulting in decreased mixing in the secondary reactor plug-flow regime.
6. Consumption of electrical energy is decreased.

The optimum recycle rate will be one which properly classifies particles between the primary reactor and secondary reactor, which allows for consistent temperature control with an acceptable, higher slurry outlet temperatures, and which allows for an acceptable rate of settling of $Ca(OH)_2$ particles in secondary reactor. In general, the recycle rate should be the lowest that will allow for acceptable temperature control.

Thermal Effects

Heats of Reaction—This thermal effect considers the heat released by reaction of calcium carbide with water and by reaction of calcium oxide with water, coupled with the rates of these reactions. The first effect from heat released by reaction of calcium carbide with water is discussed above. The second effect from hydration from calcium oxide is taken to be instantaneous and all the heat generated is considered liberated in the primary reactor, although in practice a small amount may be carried to the secondary reactor before hydrating.

In adiabatic steady-state operation of the process of the invention the energy balance equation can be written as:

accumulation=in−out+generation where, at steady-state;
  accumulation=0
  in=sensible heat of carbide feed and water
  out=sensible heat of slurry and enthalpy of the humid acetylene stream
  generation=heat of reactions Combining the energy and mass balances allows for mathematical modeling for the process performance at differing steady-state conditions. The interrelationship of process variables is demonstrated in Tables I to VI, for 25 m³/hour acetylene at a primary reactor temperature of 90° C., feeding an 80% purity $CaC_2$. The tables provide data for water inlet temperatures of 20° C. and 40° C. and system pressures of 0.05, 0.3 and 1.3 bar gauge. The data in these tables quantitatively illustrate the relationship of process variables for an adiabatic system in which no heat is consumed or dissipated. As stated elsewhere, for lower concentrations of hydrated lime it is desirable to conserve heat to reduce the acetylene losses. For concentrations higher than those shown in Tables I to VI, cooling will be required. For such cases and for a constant secondary reaction temperature the lost acetylene is directly proportional to the amount of free water discharged with the hydrated lime slurry.

Heat Transfer—This thermal effect considers free convective heat transfer, forced convective heat transfer and conductive heat transfer through solid barriers. All these combine in appropriate ways to provide energy flows from the primary reactor to the secondary reactor, from the secondary reactor to the surroundings and from the recycle loop to the surroundings.

Equilibrium—This thermal effect considers phase equilibria of three species in the system that depend on temperatures: the solubility of calcium hydroxide in water, the vapor pressure of water above the liquid in the reactor and the solubility of acetylene in the liquid in the reactor. All of these depend on temperature and the latter one depends on system pressure as well.

Process Controls of the Invention

Mass flow rate, liquid level, pressure, and temperatures are monitored and appropriate actions are taken regarding carbide input, water input, recycle rate, hydrated lime outflow and splitting ratios to heat transfer units. This is guided by safety, production and economic considerations.

Flow Rates—There are two input flows, two output flows, and one internal flow stream. The choice of the internal flow rates depends on hydrodynamic factors that are described above. The input flow of calcium carbide is dictated by the output demand for acetylene. The input flow of water is dictated by the desired output $Ca(OH)_2$ slurry concentration. Therefore, the two output streams, acetylene and hydrated lime slurry, dictate the control over the two inlet streams, calcium carbide and water, respectively. Table VII shows the relationship of these streams for differing acetylene outputs in an adiabatic system.

Liquid Level—The total liquid inventory in the reactor is conveniently and accurately controlled by monitoring the liquid level in the annulus between the weir wall 102 and the outer wall 101 and by using this information to control the flow of water entering the system (see FIG. 5, the preferred method). Alternatively, this same information could be used to control the slurry outflow from the secondary reactor (see FIG. 6, the alternative method).

Pressure—System pressure may be controlled by any convenient means. Establishing the gas delivery pressure establishes the other system pressure requirements such as slurry outlet, carbide feed, and minimum water feed pressure. Generally, a lower pressure is preferred, as the solubility of acetylene in water is lower at lower pressures than at higher pressures. The lowest practical limit is about 0.02 bar gauge. If the delivery system requires a higher pressure, the operating temperature may by increased, within regulatory limits, to partly compensate for the higher solubility of acetylene in water at higher pressures. Losses due to higher solubility may also be reduced by increasing the hydrated lime concentration in the lime slurry outlet. Higher pressures are often desired in captive acetylene systems to avoid downstream compressors, e.g., where the acetylene is required at higher pressures for direct use or as a feedstock for another process.

Temperature—Preferably, the temperature is as high as allowed by regulatory standards, which typically limit the maximum temperature to between 80° C. and 90° C. Fundamental thermodynamic considerations show that the solubility of acetylene falls to zero as the water reaches its boiling point at the prevailing pressure and dissolved solids conditions. In any case, the temperature does not exceed the regulatory limits set by safety regulations.

In general, the temperature of the system is increased by lowering heat losses from the reactor and is decreased by increasing heat losses from the reactor. Losses from the reactor occur from three principal sources 1) the enthalpy of the hydrated lime slurry outlet stream, 2) the enthalpy of the humid acetylene outlet stream, and 3) conductive and convective heat losses to the ambient surroundings. Theoretical calculations show that for typical conditions the greatest heat losses occur with item 1) and the least with item 3), with item 2) being intermediate to 1) and 3).

Temperature is most directly increased by decreasing the flow of the hydrated lime slurry outlet stream (by increasing the hydrated lime concentration). Once the desired mass flow rates and slurry concentration have been set, a desirable means of temperature control is to regulate the amount of heat losses, and to do so without interfering with the desired mass flows. This can be accomplished by varying the amount of heat transferred from the outlet streams to the inlet streams. A convenient way to do this would be, for example, to preheat the inlet water using the sensible heat of the hydrated lime slurry outflow. Alternately, the sensible heat of the acetylene stream can be used to preheat the inlet water. If cooling is required, heat may be lost to the environment by cooling the recycle stream.

Overall Control Strategy

The control system described above is particularly advantageous where the acetylene demand is variable. In most acetylene production systems, the downstream demand for acetylene can vary widely. The acetylene production is increased or decreased by varying the input of calcium carbide. The desired $Ca(OH)_2$ concentration can be maintained at a constant level by increasing or decreasing the slurry out flow to correspond with the calcium carbide in-flow. Make-up water for reactions, and losses to humidity and slurry outflow is accurately adjusted by maintaining a constant liquid inventory. Temperature is controlled by varying the heat conserved from or dissipated to the environment.

In an adiabatic system, dissipation to the environment is usually needed for slurry concentrations above about 20% to maintain the preferred temperature condition. However, for a non-adiabatic system, the isothermal condition, where no heat conservation or dissipation is required, will be a little higher because of uncontrolled heat losses. For practical systems where there are variable heat losses to the environment (summer vs. winter temperature difference) or where the recycle rate is fixed and where there are uncontrolled convective and conductive heat losses to the environment, the energy and mass balance equations suggest that the natural isothermal conditions occur at about 20–24% solids in the hydrated time slurry and for reactor pressure of 0.05 bar gauge, and feed water temperatures of about 20° C. To achieve preferred temperature conditions for hydrated lime slurries below this concentration, heat may need to be conserved. For concentrations higher than this level, heat may need to be dissipated.

The temperature control strategy is illustrated in FIG. 7, which is more fully describe elsewhere and which shows how the system can be operated with constant temperature conditions and constant hydrated lime slurry composition under varying acetylene demand.

Illustrations of Controlled Conditions

Tables VIII and IX show for a differing acetylene output stream were the recycle stream is kept constant and the temperature in controlling by controlling heat transfer to the environment. Heat transfer to the environment is controlled either 1) by conserving heat by heating the water in stream with the exit hydrated lime stream, which is shown in the table by a water-in temperature greater than 20° C., or 2) by cooling the recycle stream as shown by a positive value for recycle heat loss.

Table VII is for a calcium hydroxide concentration of 17 wt. % with a variable recycle stream but constant secondary reactor temperature. Table IX is for a calcium hydroxide concentration of 35 wt. %. In the latter, heat losses to the environment through the exit hydrated lime stream are insufficient to maintain the temperature low enough, so cooling is required for the recycle stream at all of the acetylene demands shown. In Table VII, at the lower acetylene demands, heat must be conserved to keep the temperature from falling below 90° C.

Design for Optimum Efficiency

Dimensions—Diameters and wall thickness of vessels are specified as well as diameters and wall thicknesses for piping. Also heights of vessels and lengths of piping are specified, along with any accessory structures such as gratings, weirs, etc. These decisions are guided by mass and energy flows and restraints regarding temperatures and pressures. The intents and purposes of the dimensions are discussed above. FIG. 3 is approximately to scale for system of a capacity of about 25 to 50 cubic meters acetylene per hour and shows a pressure vessel 1.2 meters in diameter.

Breakthrough—From previous considerations of reaction rates and settling velocities, the amount of unreacted calcium carbide leaving the secondary reactor with the hydrated lime slurry is calculated. Ideally the secondary reactor is sized so as to eliminate breakthrough. A larger secondary reactor decreases or eliminates breakthrough but adds to the cost of construction and the space required. In general, as long as the primary reactor is large enough to be operated in the bubble-flow regime, breakthrough will be negligible for any practical secondary reactor that can be constructed around the primary reactor.

Dissolved Acetylene—From previous considerations of acetylene solubility and mass balance, the amount of dissolved acetylene leaving the secondary reactor with the hydrated lime slurry is determined by the process conditions, namely temperatures, pressure and hydrated lime slurry concentration. Process conditions are optimized according to these considerations.

Space Utilization—This design issue assesses how much the acetylene production rate can be enhanced without increasing the volume of the reactor. Differing reactor configurations and process conditions will lead to differing utilization of available reactor space. In general, if more than 95% of the reaction is carried out in the primary reactor, then a high space utilization will be achieved.

Summary

In summary, the apparatus of the invention allows for a high level of control over mass flow and temperature and pressure in a dual reactor system, reducing the reactor space required to achieve a prescribed level of conversion, easing the fabrication requirements, providing a high level of recovery of acetylene produced and producing a more consistent and easily managed hydrated lime slurry.

The control of the invention independently maintains constant slurry concentrations and reactor temperature, even when acetylene demand is varied or when ambient temperatures, feed water temperatures or other temperature effects are varied. The control of the invention allows for operation at preferred temperature and slurry concentrations even when the pressure is varied.

The process of the invention maintains high recovery of acetylene by operating at high temperatures and high slurry concentrations even when demand for acetylene production is varied.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention. It will be recognized that the process conditions disclosed herein may not comply with local regulatory standards, and that in practice of the invention compliance with all regulatory standards in effect must be made.

TABLE I

FOR A PRESSURE OF 0.05 BAR GAUGE
25 $m^3$/hr. ACETYLENE PRODUCTION AND
AT REACTOR TEMPERATURE OF 90° C.

| Fresh Water (t = 20° C. in Kg/hr) | Re-cycle Ratio | Recycle Rate (Kg/hr) | Temperature Out (° C.) | Carbide Lime Out (Kg/Hr) | $Ca(OH)_2$ In Outlet (%) | $C_2H_2$ In Outlet (Kg/hr) |
|---|---|---|---|---|---|---|
| 350 | 18.00 | 6300 | 86.5 | 383.00 | 26.50 | 0.079 |
| 400 | 11.25 | 4400 | 84.4 | 437.50 | 23.19 | 0.106 |
| 450 | 7.55 | 3398 | 82.0 | 491.50 | 20.02 | 0.136 |
| 514 | 4.97 | 2555 | 78.7 | 562.78 | 18.00 | 0.183 |
| 540 | 4.41 | 2381 | 77.2 | 587.59 | 17.24 | 0.201 |
| 550 | 4.19 | 2305 | 76.7 | 598.11 | 16.94 | 0.209 |
| 560 | 3.98 | 2229 | 76.1 | 608.77 | 16.64 | 0.217 |
| 570 | 3.80 | 2166 | 75.5 | 619.20 | 16.36 | 0.225 |
| 600 | 3.30 | 1980 | 73.9 | 650.68 | 15.57 | 0.250 |
| 650 | 2.69 | 1749 | 71.1 | 702.80 | 14.41 | 0.292 |
| 700 | 2.25 | 1576 | 68.5 | 754.54 | 13.43 | 0.336 |
| 800 | 1.67 | 1334 | 63.7 | 857.26 | 11.82 | 0.425 |
| 900 | 1.31 | 1177 | 59.6 | 959.31 | 10.56 | 0.517 |
| 1000 | 1.07 | 1070 | 56.1 | 1060.96 | 9.55 | 0.609 |
| 1100 | 0.9 | 990 | 53.1 | 1162.37 | 8.71 | 0.701 |

TABLE II

FOR A PRESSURE OF 0.05 BAR GAUGE
25 $m^3$/hr. ACETYLENE PRODUCTION AND
AT REACTOR TEMPERATURE OF 90° C.

| Fresh Water (t = 40° C. in Kg/hr) | Re-cycle Ratio | Recycle Rate (Kg/hr) | Temperature Out (° C.) | Carbide Lime Out (Kg/Hr) | $Ca(OH)_2$ In Outlet (%) | $C_2H_2$ In Outlet (Kg/hr) |
|---|---|---|---|---|---|---|
| 526 | 13.49 | 7098 | 86.7 | 562.85 | 18.00 | 0.122 |
| 610 | 6.84 | 4174 | 83.8 | 651.07 | 15.56 | 0.176 |
| 650 | 5.50 | 3577 | 82.5 | 692.92 | 14.62 | 0.202 |
| 670 | 5.00 | 3353 | 81.8 | 713.81 | 14.19 | 0.215 |
| 690 | 4.58 | 3162 | 81.2 | 734.68 | 13.79 | 0.228 |
| 730 | 3.90 | 2847 | 79.9 | 776.29 | 13.05 | 0.256 |
| 750 | 3.65 | 2738 | 79.3 | 797.12 | 12.71 | 0.269 |
| 800 | 3.10 | 2480 | 77.9 | 849.03 | 11.93 | 0.303 |
| 850 | 2.68 | 2278 | 76.5 | 900.73 | 11.25 | 0.338 |
| 900 | 2.35 | 2115 | 75.1 | 952.24 | 10.64 | 0.374 |
| 950 | 2.08 | 1976 | 73.8 | 1003.60 | 10.09 | 0.410 |
| 1000 | 1.87 | 1870 | 72.6 | 1054.83 | 9.60 | 0.448 |
| 1050 | 1.69 | 1772 | 71.4 | 1105.95 | 9.16 | 0.485 |
| 1100 | 1.54 | 1692 | 70.3 | 1156.98 | 8.76 | 0.523 |

TABLE III

FOR A PRESSURE OF 0.3 BAR GAUGE
25 m³/hr. ACETYLENE PRODUCTION ON AND
AT REACTOR TEMPERATURE OF 90° C.

| Fresh Water (t = 20° C. in Kg/hr) | Re-cycle Ratio | Recycle Rate (Kg/hr) | Temperature Out (° C.) | Carbide Lime Out (Kg/Hr) | $Ca(OH)_2$ In Outlet (%) | $C_2H_2$ In Outlet (Kg/hr) |
|---|---|---|---|---|---|---|
| 450 | 13.50 | 6075 | 85.3 | 494.20 | 20.51 | 0.18 |
| 510 | 7.36 | 3754 | 81.7 | 553.55 | 18.3 | 0.23 |
| 550 | 5.40 | 2970 | 79.2 | 595.53 | 17.01 | 0.27 |
| 570 | 4.74 | 2702 | 77.9 | 616.18 | 16.44 | 0.29 |
| 600 | 3.97 | 2382 | 76.0 | 647.28 | 15.65 | 0.33 |
| 650 | 3.09 | 2009 | 72.9 | 698.62 | 14.50 | 0.38 |
| 700 | 2.50 | 1750 | 70.0 | 749.81 | 13.51 | 0.43 |
| 800 | 1.78 | 1424 | 64.8 | 851.26 | 11.90 | 0.55 |
| 900 | 1.38 | 1239 | 60.4 | 952.07 | 10.64 | 0.66 |

TABLE IV

FOR A PRESSURE OF 0.3 BAR GAUGE
25 m³/hr. ACETYLENE PRODUCTION AND
AT REACTOR TEMPERATURE OF 90° C.

| Fresh Water (t = 40° C. in Kg/hr) | Re-cycle Ratio | Recycle Rate (Kg/hr) | Temperature Out (° C.) | Carbide Lime Out (Kg/Hr) | $Ca(OH)_2$ In Outlet (%) | $C_2H_2$ In Outlet (Kg/hr) |
|---|---|---|---|---|---|---|
| 600 | 14.50 | 8700 | 86.8 | 642.20 | 15.75 | 0.24 |
| 650 | 8.98 | 5837 | 85.1 | 695.74 | 14.56 | 0.27 |
| 700 | 6.36 | 4452 | 83.3 | 748.15 | 13.54 | 0.32 |
| 750 | 4.84 | 3630 | 81.5 | 800.16 | 12.66 | 0.36 |
| 800 | 3.88 | 3104 | 79.8 | 851.98 | 11.89 | 0.40 |
| 850 | 3.20 | 2720 | 78.2 | 902.85 | 11.22 | 0.45 |
| 900 | 2.73 | 2457 | 76.6 | 954.76 | 10.61 | 0.50 |
| 950 | 2.35 | 2233 | 75.1 | 7005.96 | 10.07 | 0.54 |
| 1000 | 2.07 | 2070 | 73.7 | 1056.31 | 9.59 | 0.59 |
| 1050 | 1.84 | 1932 | 72.4 | 1108.32 | 9.14 | 0.64 |
| 1100 | 1.66 | 1826 | 71.2 | 1158.77 | 8.74 | 0.69 |

TABLE V

FOR A PRESSURE OF 1.3 BAR GAUGE
25 m³/hr. ACETYLENE PRODUCTION AND
AT REACTOR TEMPERATURE OF 90° C.

| Fresh Water (t = 20° C. in Kg/hr) | Re-cycle Ratio | Recycle Rate (Kg/hr) | Temperature Out (° C.) | Carbide Lime Out (Kg/Hr) | $Ca(OH)_2$ In Outlet (%) | $C_2H_2$ In Outlet (Kg/hr) |
|---|---|---|---|---|---|---|
| 540 | 11.10 | 5994 | 84.3 | 593.79 | 17.04 | 0.55 |
| 550 | 10.20 | 5610 | 83.8 | 599.76 | 16.89 | 0.56 |
| 560 | 8.80 | 4928 | 82.9 | 610.24 | 16.60 | 0.58 |
| 570 | 7.70 | 4389 | 82.1 | 620.33 | 16.33 | 0.60 |
| 585 | 6.56 | 3838 | 80.8 | 635.91 | 15.93 | 0.63 |
| 600 | 5.65 | 3390 | 79.6 | 651.03 | 15.56 | 0.66 |
| 650 | 3.88 | 2522 | 75.7 | 703.47 | 14.40 | 0.75 |
| 700 | 2.94 | 2058 | 72.3 | 752.60 | 13.46 | 0.85 |
| 800 | 1.96 | 1568 | 66.3 | 853.41 | 11.87 | 1.04 |
| 900 | 1.47 | 1320 | 61.5 | 955.66 | 10.60 | 1.24 |

TABLE VI

FOR A PRESSURE OF 1.3 BAR GAUGE
25 m³/hr. ACETYLENE PRODUCTION AND
AT REACTOR TEMPERATURE OF 90° C.

| Fresh Water (t = 40° C. in Kg/hr) | Re-cycle Ratio | Recycle Rate (Kg/hr) | Temperature Out (° C.) | Carbide Lime Out (Kg/Hr) | $Ca(OH)_2$ In Outlet (%) | $C_2H_2$ In Outlet (Kg/hr) |
|---|---|---|---|---|---|---|
| 700 | 32.00 | 22400 | 88.5 | 748.15 | 13.54 | 0.67 |
| 750 | 11.50 | 8625 | 86.0 | 798.90 | 12.68 | 0.76 |
| 800 | 6.90 | 5520 | 83.7 | 849.83 | 11.92 | 0.84 |
| 850 | 4.90 | 4165 | 81.6 | 900.44 | 11.25 | 0.93 |
| 900 | 3.78 | 3402 | 79.6 | 951.17 | 10.65 | 1.01 |
| 950 | 3.08 | 2926 | 77.7 | 1001.98 | 10.11 | 1.10 |
| 1000 | 2.58 | 2580 | 76.1 | 1051.92 | 9.63 | 1.19 |
| 1050 | 2.23 | 2342 | 74.5 | 1102.29 | 9.19 | 1.27 |
| 1100 | 1.96 | 2156 | 73.1 | 1152.45 | 8.79 | 1.36 |

TABLE VII

ADIABATIC OPERATION FOR A PRESSURE OF 0.3 BAR GAUGE
PRIMARY REACTOR TEMPERATURE 90° C.
SECONDARY REACTOR TEMPERATURE 79.2 ° C.
INPUT WATER 20° C.
TOTAL REACTOR VOLUME 1.3 m³
EXIT LIME STREAM CONCENTRATION 17 WT. %

| Acetylene Demand (m³/hr) | Calcium Carbide In (Kg/hr) | Water In (Kg/hr) | Recycle (Kg/hr) | Lime Out (Kg/hr) | Lost Acetylene (Kg/hr) |
|---|---|---|---|---|---|
| 50 | 178.4 | 1100 | 5940 | 1192 | 0.54 |
| 45 | 160.56 | 990 | 5346 | 1072.8 | 0.486 |
| 40 | 142.72 | 880 | 4752 | 953.6 | 0.432 |
| 35 | 124.88 | 770 | 4158 | 834.4 | 0.39 |
| 30 | 107.04 | 660 | 3564 | 715.2 | 0.32 |
| 25 | 89.2 | 550 | 2970 | 596 | 0.27 |
| 20 | 71.36 | 440 | 2376 | 476.8 | 0.22 |
| 15 | 53.52 | 330 | 1782 | 357.6 | 0.16 |
| 10 | 35.68 | 220 | 1188 | 238.4 | 0.11 |

TABLE VIII

ADIABATIC OPERATION EXCEPT HEATING OF INPUT
STREAMS BY EXIT LIME STREAM OR COOLING OF
RECYCLE STREAM BY COOLING WATER
RECYCLE STREAM 4000 Kg/hr
TOTAL REACTOR VOLUME 1.3 m³
PRIMARY REACTOR TEMPERATURE 90° C.
PRESSURE 0.3 BAR GAUGE
EXIT LIME STREAM CONCENTION 17 WT. %

| Acetylene Demand (m³/hr) | Calcium Carbide in (Kg/hr) | Water In (Kg/hr) | Water In (° C.) | Recycle Heat Loss (Kcal/hr) | Lime Out (Kg/hr) | Lost Acetylene (Kg/hr) | Temperature Sec. Reactor (° C.) |
|---|---|---|---|---|---|---|---|
| 50 | 178.4 | 1100 | 20.00 | 20960 | 1192 | 0.54 | 79.20 |
| 45 | 160.5 | 990 | 20.00 | 14520 | 1072.8 | 0.486 | 79.20 |
| 40 | 142.7 | 880 | 20.00 | 8120 | 953.6 | 0.432 | 79.20 |
| 35 | 124.9 | 770 | 20.00 | 1720 | 834.4 | 0.378 | 79.20 |
| 30 | 107.0 | 660 | 23.00 | 0 | 715.2 | 0.316 | 80.62 |
| 25 | 89.2 | 550 | 26.40 | 0 | 596 | 0.249 | 82.48 |
| 20 | 71.4 | 440 | 29.86 | 0 | 476.8 | 0.185 | 84.27 |
| 15 | 53.5 | 330 | 33.50 | 0 | 357.6 | 0.125 | 86.04 |
| 10 | 35.7 | 220 | 37.31 | 0 | 238.4 | 0.069 | 87.78 |

TABLE IX

ADIABATIC OPERATION EXCEPT COOLING OF
RECYCLE STREAM BY COOLING WATER
RECYCLE STREAM 4000 Kg/hr
TOTAL REACTOR VOLUME 1.3 m$^3$
PRIMARY REACTOR TEMPERATURE 90° C.
PRESSURE 0.3 BAR GAUGE
EXIT LIME STREAM CONCENTRATION 35 WT. %

| Acety-lene Demand (m$^3$/hr) | Calcium Carbide in (Kg/hr) | Water In (Kg/hr) | Water In (° C.) | Recycle Heat Loss (Kcal/hr) | Lime Out (Kg/hr) | Lost Acety-lene (Kg/hr) | Temperature Sec. Reactor (° C.) |
|---|---|---|---|---|---|---|---|
| 50 | 178.4 | 477.0 | 20.00 | 42300 | 582.5 | 0.236 | 73.06 |
| 45 | 160.5 | 431.0 | 20.00 | 36700 | 524.3 | 0.204 | 75.05 |
| 40 | 142.7 | 384.0 | 20.00 | 31000 | 465.4 | 0.174 | 76.90 |
| 35 | 124.9 | 338.0 | 20.00 | 25500 | 407.6 | 0.146 | 78.81 |
| 30 | 107.0 | 291.0 | 20.00 | 20400 | 349.1 | 0.119 | 80.63 |
| 25 | 89.2 | 244.0 | 20.00 | 15700 | 291.0 | 0.094 | 82.40 |
| 20 | 71.4 | 197.0 | 20.00 | 11400 | 233.3 | 0.072 | 84.17 |
| 15 | 53.5 | 148.5 | 20.00 | 7700 | 174.6 | 0.051 | 85.72 |
| 10 | 35.7 | 100.0 | 20.00 | 4470 | 116.6 | 0.032 | 87.33 |

What is claimed is:

1. An apparatus for the production of acetylene and hydrated lime by the reaction of water with calcium carbide particles comprising;
   a primary reactor constructed for upward flow of water and with an upward water velocity control flow restrictor disposed to direct the upward flow of water in the primary reactor, the restrictor constructed and sized to allow impurities denser than hydrated lime produced by reaction of water and calcium carbide particles in the primary reactor to settle into a holding zone, and to entrain and carry upwards calcium carbide particles of less than a predetermined size and hydrated lime up and over an overflow at a periphery of the primary reactor,
   water inlet for introducing water into the primary reactor for upward flow through the velocity control restrictor,
   makeup water inlet for introducing makeup water into the primary reactor,
   feeder for introducing calcium carbide into the top of the primary reactor,
   secondary reactor concentrically disposed around the primary reactor such that water with calcium carbide particles and hydrated lime from primary reactor flowing over the overflow flow directly into the secondary reactor, the secondary reactor constructed and dimensioned to provide essentially plug-flow reaction of water with calcium carbide particles and to allow the hydrated lime produced in the primary and secondary reactors to settle into a dense zone at the bottom of the secondary reactor,
   acetylene output for withdrawing acetylene produced in the primary and secondary reactors, hydrated lime output for withdrawing hydrated lime that has settled in the dense zone from the dense zone of the secondary reactor,
   secondary water output for withdrawing water from the secondary reactor from a region in the secondary reactor not in the dense zone,
   recycle conduit directing from the secondary water output to the water inlet of primary reactor.

2. An apparatus as in claim 1 wherein the primary reactor and the secondary reactor are enclosed within a common vessel capable of being pressurized.

3. An apparatus as in claim 1 wherein the makeup water inlet is constructed to introduce fresh makeup water into the upward velocity control flow restrictor.

4. An apparatus as in claim 1 wherein the makeup water inlet is constructed to introduce fresh makeup water directly into the primary reactor not through the velocity control flow restrictor.

5. An apparatus as in claim 1 additionally comprising a screen disposed above the velocity control flow restrictor sized to prevent large particles from prematurely descending through the velocity restrictor.

6. An apparatus as in claim 1 wherein the overflow comprises a weir over which water with entrained hydrated lime and calcium carbide particles flow from the primary reactor to the secondary reactor.

7. The apparatus of claim 1 wherein the secondary water output comprises a weir over which water leaving the secondary reactor flows and which maintains a predetermined liquid level in the secondary reactor.

8. The apparatus of claim 7 wherein the primary and the secondary reactor are enclosed within a common pressure vessel capable of being pressurized.

9. The apparatus of claim 8 wherein an annulus is formed between the secondary reactor and the pressure vessel and water flowing over the weir flows into the annulus.

10. The apparatus of claim 9 additionally comprising a controller for maintaining the water level in the annulus at or above a predetermined level.

11. An apparatus for the production of acetylene and hydrated lime by the reaction of calcium carbide particles with an excess of water comprising,
    a primary reactor for initial reaction of the calcium carbide particles with water,
    a secondary reactor sized and configured for reaction of essentially all of the calcium carbide particles that is not reacted in the primary reactor and such that the hydrated lime produced in the primary and secondary reactors settles into a dense zone in bottom of the secondary reactor,
    the primary reactor concentrically disposed within the secondary reactor such that water with entrained calcium carbide particles and hydrated lime from the primary reactor flows directly into the secondary reactor via an overflow at a periphery of the primary reactor,
    a hydrated lime output for withdrawing hydrated lime from the dense zone.

12. An apparatus as in claim 11 wherein the primary reactor is constructed and configured to provide a reaction environment where unreactive particles are allowed to settle, and unreacted calcium carbide particles and hydrated lime produced by the reaction of water and calcium carbide particles are entrained and carried to the secondary reactor.

13. An apparatus as in claim 11 wherein the primary and the secondary reactor are enclosed within a common pressure vessel capable of being pressurized.

14. An apparatus as in claim 11 additionally comprising a water recycle conduit for directing water form the secondary reactor to the primary reactor.

15. An apparatus as in claim 12 wherein the overflow of the primary reactor comprises a weir over which the water with entrained calcium carbide particles and hydrated lime from the primary reactor flows directly in the secondary reactor.

16. An apparatus as in claim 12 wherein the reaction environment is provided by an entrained flow water system with a water flow restrictor constructed to direct a flow of water up through the primary reactor to create the entrained flow.

* * * * *